US007546223B2

(12) United States Patent
Parker et al.

(10) Patent No.: US 7,546,223 B2
(45) Date of Patent: Jun. 9, 2009

(54) PROCESS AND SYSTEM OF ENERGY SIGNAL DETECTION

(75) Inventors: James Parker, Temple City, CA (US); Randall Wang, Temple City, CA (US)

(73) Assignee: EE Systems Group Inc., Temple City, CA (US)

( * ) Notice: Subject to any disclaimer, the term of this patent is extended or adjusted under 35 U.S.C. 154(b) by 386 days.

(21) Appl. No.: 11/449,577

(22) Filed: Jun. 7, 2006

(65) Prior Publication Data

US 2007/0288108 A1 Dec. 13, 2007

(51) Int. Cl.
*G06F 19/00* (2006.01)
*G06F 17/40* (2006.01)

(52) U.S. Cl. ........................ 702/189; 340/500; 340/540

(58) Field of Classification Search ................ 73/432.1, 73/865.8; 324/158.1; 340/5.1, 425.5, 426.1, 340/426.24, 426.64, 500, 540, 541, 565, 340/567, 573.1, 825, 825.36, 870.01, 870.05, 340/870.07, 870.16; 702/1, 127, 189, 190, 702/191, 194, 199

See application file for complete search history.

(56) References Cited

U.S. PATENT DOCUMENTS

| | | | | |
|---|---|---|---|---|
| 2,947,971 | A * | 8/1960 | Glauberman et al. | 382/207 |
| 3,478,328 | A * | 11/1969 | Schillinger | 702/199 |
| 3,488,482 | A * | 1/1970 | Ley | 702/198 |
| 6,597,777 | B1 * | 7/2003 | Ho | 379/133 |

* cited by examiner

*Primary Examiner*—Edward R Cosimano
(74) *Attorney, Agent, or Firm*—Raymond Y. Chan; David and Raymond Patent Firm

(57) ABSTRACT

A process and system of energy signal detection, which improves sensitivity, performance and reliability thereof and reduces false alarms by distinguishing between noise and real signals, includes the steps of receiving a plurality of data samples and generating a predetermined number of constructed sample windows of constructed samples in time, determining a control range for each of said constructed sample windows, determining whether there is an alarm pre-condition by comparing relationship between successive constructed sample windows, and generating an output signal when the alarm pre-condition is qualified.

86 Claims, 17 Drawing Sheets

*Two Sample Windows (1000-2000 & 4000-5000)*

*Discontinuity*

PROCESS AND SYSTEM OF ENERGY SIGNAL DETECTION

BACKGROUND OF THE PRESENT INVENTION

1. Field of Invention

The present invention relates to energy signal detection, and more particularly to a process and system of energy signal detection that can minimizes false alarms and maximize the sensitivity, performance and reliability of the energy signal detection.

2. Description of Related Arts

The great number of false alarms is causing the security industry to loose credibility with government and private enforcement agencies. A trend of no response policies and heavy fines for false alarms is in place already for many jurisdictions. Some false alarms are user related, but the majority of false alarms originate from Passive Infra Red (PIR) detectors, most of which in use today are low end, low cost units.

A motion detector is a kind of energy signal detection device which utilizes Passive Infra-Red (PIR) technology to detect movement of body heat to activate the alarm in the event of an intrusion. The conventional motion sensor, such as PIR detector, usually comprises a sensor casing, a sensing element, a lens directing infrared energy onto the sensing element so as to detect a movement of a physical object within a detecting area, and a decision making circuit (which may comprise of an analog-to-digital converter) for compiling an electrical signal which is outputted from the sensing element so as to recognize the physical movement in the detecting area.

A typical conventional energy signal detector uses a pyroelectric sensing module as the sensing element that has a very low analog signal level output. A low but still usable AC signal is in the order of 1 to 2 mVp-p with a much larger ~10 mVp-p of high frequency noise component, all of which rides on a DC component of 400 mV to 2000 mV, that will change with temperature, aging and also part to part. The usable frequency component of this signal is from 0.1 Hz to 10 Hz. The lens directs infrared energy onto this sensing element. The sensing element's output is traditionally fed into a tight band pass filter stage to reduce high frequency noise and strip the DC element that the signal rides on. It is then fed into a high gain stage (typically ~72 db) so that the signal can be used by either discreet components or by a microcontroller to make decisions and act upon them.

A drawback of the traditional energy signal detector is the filter and gain stages. By filtering the signal, it also removes information that is sometimes critical to being able to make a reliable decision. Any signal discontinuity between the sensing element and the filter stage due to external electrical factors or forces will look no different then a low level infrared energy signature at the output of the gain stage. This impacts the energy signal detector's maximum range and pet immunity reliability. The typical information processing methods available after these stages are to do root mean squared energy under the curve analysis or similar, to determine if the energy exceeds a threshold limit. Older detecting processors do not have the processing power for more elegant techniques to be used. There is also a frequency component as well. It will vary from 0.1 Hz to 10 Hz and change with movement. There is often not even a single full cycle of any given frequency to use.

With such limitations due to the signal pre-conditioning, almost all conventional energy signal detectors include a "pulse count" feature that basically admits that the energy signal detector can false under normal operating conditions. Higher end, more expensive, energy signal detectors can include a secondary sensing method (such as a micro wave sensor) where it needs one technology to confirm the other in the decision making process.

More specifically, the pyroelectric sensing module usually comprises a signal input to receive an infrared signal created by infrared energy of a moving target, for example, in the detecting area, a signal output adapted for producing a predetermined level of output signal in response to the infrared signal, wherein the output signal is fed into the decision making circuit for further analysis for recognizing the physical movement of the moving target in the detecting area.

A major problem for the conventional energy signal detector, especially a motion detector, is that the output signal of the pyroelectric sensing module (+DC offset) is very low, typically in the order of milli-volts, so that the output signal corresponding with actual physical movement within the detecting area is easily superseded by surrounding noise or other factors which may affect the infrared energy received by the pyroelectric sensing module. As a result, the overall performance of the conventional motion sensor will be limited.

In order to overcome this problem, the motion detector may further comprise a signal filtering circuitry and a signal amplifying circuitry electrically connected with the pyroelectric sensing module, wherein the output signals of the pyroelectric sensing module are fed into the signal filtering circuitry and the signal amplifying circuitry which are arranged to filter noise signals and amplify the remaining signals respectively for further processing of the output signals of the pyroelectric sensing module. Therefore, some signals are removed from the output signals when they have passed through the signal filtering circuitry and the signal amplifying circuitry.

A persistent problem with such signal filtering and signal amplifying strategies is that some signals which reflect the actual physical movement, as opposed to surrounding noise, may be mistakenly removed by the signal filtering circuitry so that the real or actual physical movements within the detecting area may not be successfully detected. On the other hand, those output signals which reflect surrounding noise or any other environmental factors may be mistakenly interpreted as an actual physical movement in the detecting area so that false alarms may be generated as a result.

One way to overcome these design limitations is to feed the signals directly into a DSP processor. A DSP processor is capable of working very well with low signal levels and high frequency components. Aside from significant cost increases with this approach, it still has its technical drawbacks as well. For example, the DSP consumes higher power than what is typically allotted for a PIR design.

A DSP processor is designed to work on signals in the frequency domain. It is uniquely tailored to be able to accomplish Fourier math analysis of signals at high frequencies. The problem here is this signal exists predominantly in the time domain. There is no consistent signal frequency to analyze. Also the slower in frequency the signal is, the more storage and horsepower will be required by the processor to be able to detect it. One would want to digitally filter the high frequency noise component so as to detect discontinuities. This means that it needs to sample for durations of time in the order of seconds to be able to detect the low frequency signal required.

This then becomes as issue for storage of the samples to be worked on. Increasing the storage, results in increasing the cost yet again.

SUMMARY OF THE PRESENT INVENTION

A main object of the present invention is to provide a process and system of energy signal detection that not only improves the sensitivity, performance and reliability thereof, but also reduces false alarms by distinguishing between noise and real signals.

Another object of the present invention is to provide a process and system of energy signal detection, wherein all energy signals detected are being inputted for distinguishing between environmental noise and real signals through statistical computation. In other words, no energy signal will be filtered before computation like the conventional energy signal detector that may result in removing real signals at the same time while filtering noise signals.

Another object of the present invention is to provide a process and system of energy signal detection, wherein the environmental noise and real signals included in the detected energy signals being inputted are distinguished by means of the control ranges between Upper Control Limits (UCL) and Lower Control Limits (LCL) which are calculated and used based on standard deviation points and the A2 factor.

Another object of the present invention is to provide a process and system of energy signal detection, which improves energy input resolution by providing a differential voltage reference internally for the inputted energy signals.

Another object of the present invention is to provide a process and system of energy signal detection, which further increases resolution by not taking any signal conversion as an accurate measurement of the signals but to sample all inputted energy signals with time for data processing.

Another object of the present invention is to provide a process and system of energy signal detection that provides a non polarity output by dual switching the "ZONE" and "COM" connections of the control panel to ground.

Another object of the present invention is to provide a process and system of energy signal detection which can avoid false alarms created by white light without the use of complicated and expensive lens that is made to block the white light or the installation of a white light filter on the lens or the sensor or a white light detector, such as CDS photocell detector.

Another object of the present invention is to provide a process and system of energy signal detection which can substantially achieve the above objects while minimizing the mechanical and electrical components so as to minimize the manufacturing cost as well as the ultimate selling price of the system.

Accordingly, in order to accomplish the above objects, the present invention provides a process of energy signal detection, comprising the steps of:

(a) receiving a plurality of data samples and generating a predetermined number of constructed sample windows of constructed samples in time;

(b) determining a control range for each of the constructed sample windows;

(c) determining whether there is an alarm pre-condition by comparing relationships between successive constructed sample windows; and (d) generating an output signal when the alarm pre-condition is qualified.

The energy signal detection described above is processed in a system comprising:

an energy sensor defining a detecting area and detecting energy directed there within to produce inputted energy signals;

a microcontroller, which is electrically connected to the energy sensor, comprising a means for converting the inputted energy signals into data samples, such as an analog-to-digital converter (A/D converter or ADC), wherein a plurality of data samples are constructed to form a predetermined number of constructed sample windows of constructed samples in time, wherein a control range is determined for each of the constructed sample windows, and thus by comparing the relationships between the successive constructed sample windows, the microcontroller is capable of determining whether there is an alarm condition or pre-condition; and an alarm output circuit electrically connected from the microcontroller for changing output state from restore to alarm for a predetermined period of time when the microcontroller determines the alarm condition.

These and other objectives, features, and advantages of the present invention will become apparent from the following detailed description, the accompanying drawings, and the appended claims.

DETAILED DESCRIPTION OF THE PREFERRED EMBODIMENT

Figure 1:
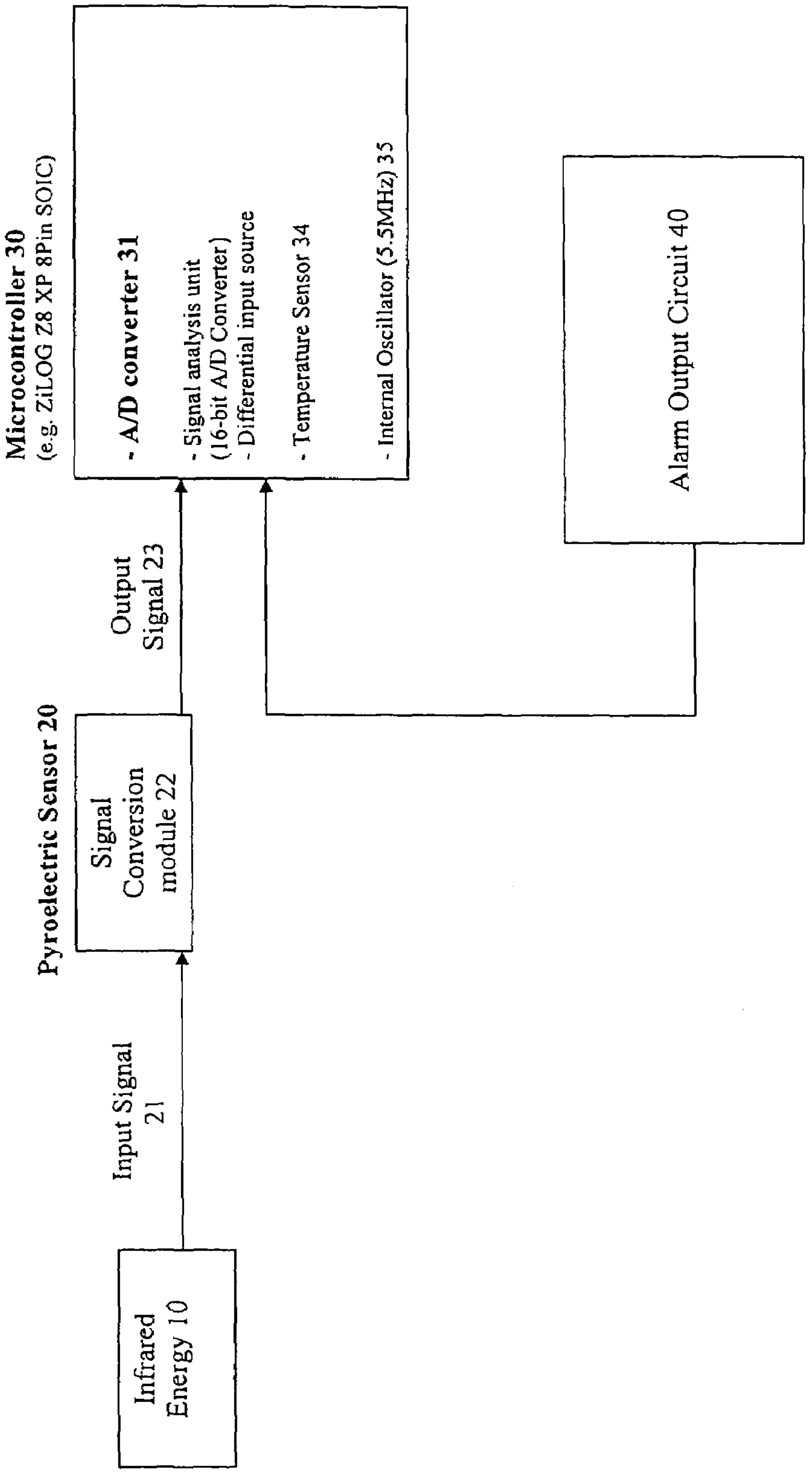
FIG. 1 is a block diagram of a system of energy signal detection according to a preferred embodiment of the present invention.

Referring to FIG. 1 to FIG. 4 of the drawings, the present invention provides a process and system of energy signal detection according to a preferred embodiment as illustrated. The process and system of energy signal detection according to the present invention is adapted to detect motion, such as a PIR motion detector, or various other kinds of energy derived from sensors for items such as smoke, temperature, gas, and light.

According to the present invention, the system of energy signal detection comprises an energy sensor 20, a microcontroller 30 and an alarm output circuit 40, wherein the energy sensor 20 is adapted for defining a detecting area and detecting energy directed there within to produce inputted energy signals.

The microcontroller 30, which is electrically connected to the energy sensor 20, comprising an analog-to-digital converter (A/D converter or ADC) 31 to convert the inputted energy signals into data samples, wherein a plurality of data samples are averaged to form a predetermined number of constructed sample windows of constructed samples in time, wherein a control range is determined for each of the constructed sample windows, and thus by comparing relationships between the successive constructed sample windows, the microcontroller 30 is capable of determining whether there is an alarm condition.

The alarm output circuit 40 is electrically connected from the microcontroller 30 for changing output stage from restore to alarm for a predetermined period of time when the microcontroller 30 determines the alarm condition.

According to the preferred embodiment of the present invention, the energy signal detection system is embodied as an infrared sensor where the energy sensor is embodied as a pyroelectric sensor 20 which is a pyroelectric sensing element adapted for sensing energy radiation, i.e. the infrared energy 10 according to the preferred embodiment, within a detecting area. The pyroelectric sensor 20 is passive and has two or more detecting elements for detecting energy, wherein a signal will be emitted when a difference exists in the energy being detected between the individual elements.

The infrared energy 10 is directed onto the pyroelectric sensor 20, wherein the infrared radiation 10 as an input signal 21 is converted into an output signal 23 through a signal conversion module 22 of the pyroelectric sensor 20, wherein the output signals 23 generally contain real signals with low frequency and noise signals mixed therewith.

The microcontroller 30 is embodied as an integrated circuit, such as a ZiLOG Z8 XP 8 Pin SOIC, wherein ZiLOG is the manufacturer symbol, Z8 is the product line symbol and XP is the family symbol of the microcontroller. The microcontroller 30 has the A/D converter 31 converting the output signals 23 from the pyroelectric sensor 20 to data samples for data processing.

According to the preferred embodiment of the present invention, a 10 bit sigma delta A/D converter is used. In order to enhance the input resolution of the A/D converter 31, the present invention provides a differential voltage reference internally for the inputted energy signals, referring to FIGS. 2 and 11, wherein the PIN3 of the microcontroller 30 is fed with a voltage reference, $V_{REF}$, generated from an internal voltage reference generator 321 while the PIN5 of the microcontroller 30 is fed with the output signals 23 from the pyroelectric sensor 20, wherein the lower the voltage reference $V_{REF}$ provides more resolution.

Figure 2:
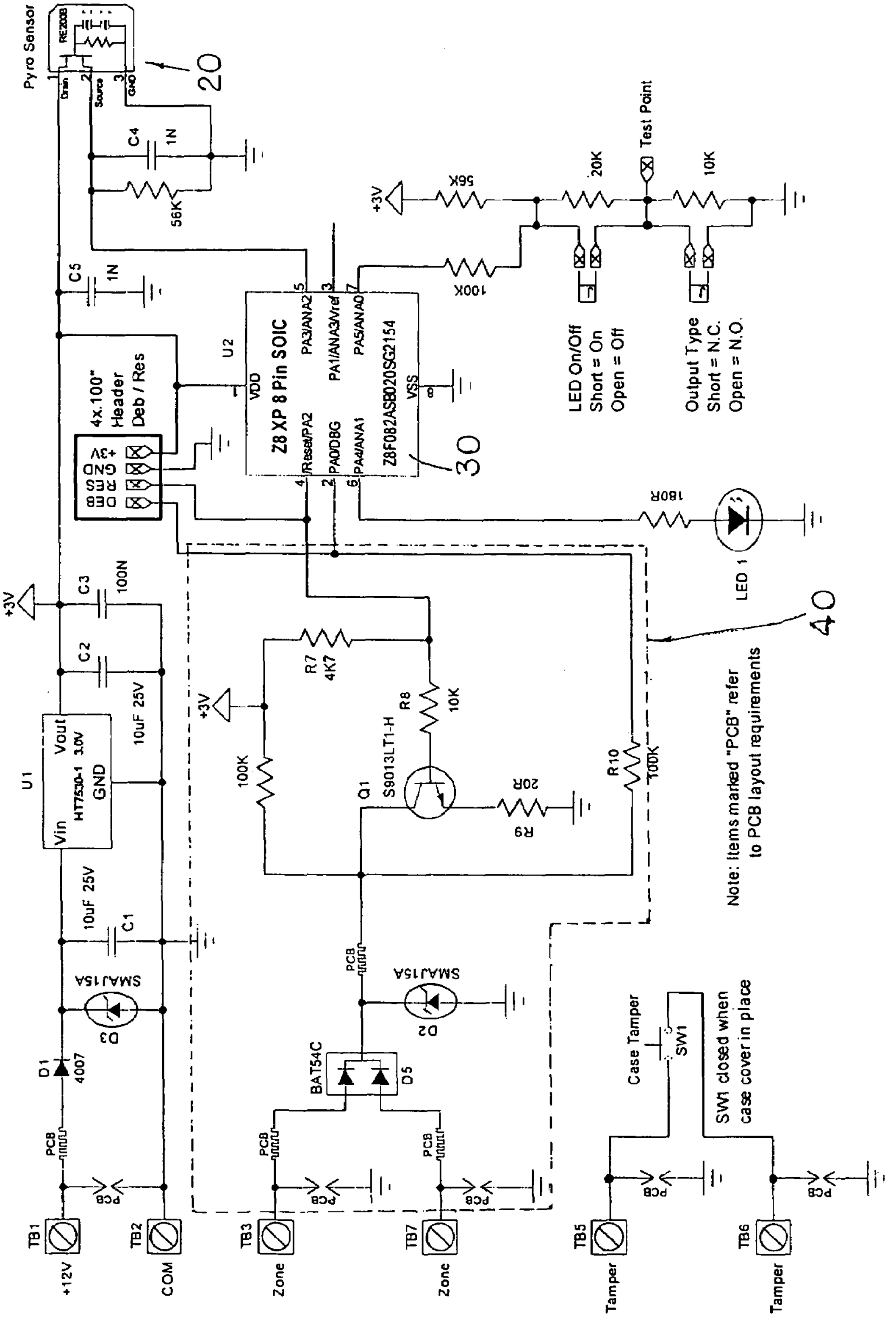
FIG. 2 is a circuit diagram of the energy signal detection system according to the above preferred embodiment of the present invention.
Figure 11:
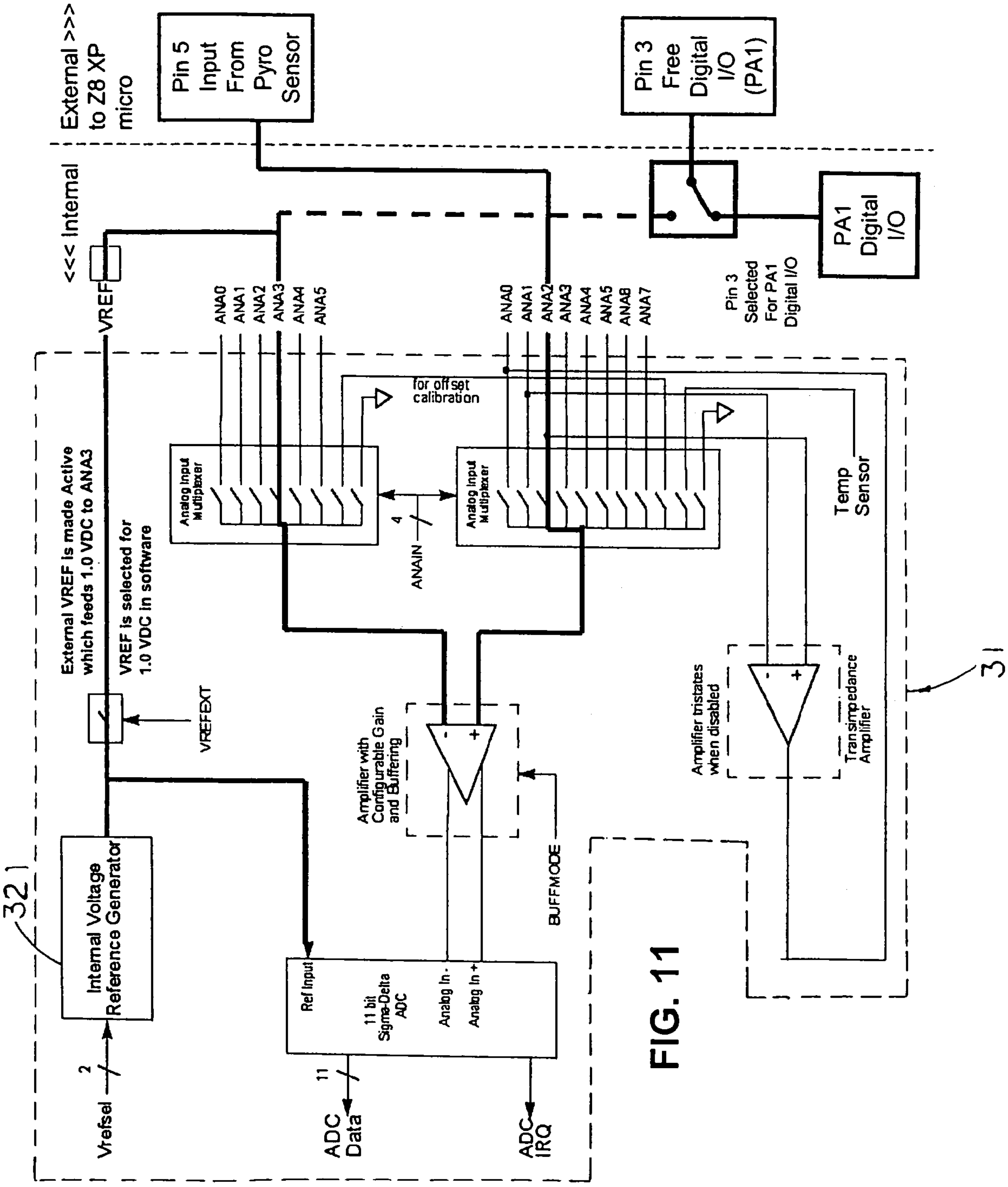
FIG. 11 is a block diagram illustrating the analog-to-digital converter of the energy signal detection system according to the above preferred embodiment of the present invention.

According to the preferred embodiment of the present invention, referring to FIGS. 2 and 11, the microcontroller 30 internally provides a 1V voltage reference ($V_{REF}$) at the ANA3 node while 0V-2V output signals 23 are fed to the ANA2 node via PIN 5 from the pyroelectric sensor 20, wherein any output signal inputted from the pyroelectric sensor 20 is a positive signed signal when its voltage is between 1V to 2V, or is a negative signed signal when its voltage is between 0V to 1V. Accordingly, such differential input of the output signal 23 from the pyroelectric sensor 20 gives a value equal to the difference between the inputs so as to substantially enhance the input resolution of the A/D converter 31 from 10 bits to 11 bits.

The A/D converter 31 such as the 10 bit sigma delta converter as mentioned above may provide a high degree of accuracy for a tradeoff in conversion speed. Internally the data is guaranteed to 10 bits of accuracy resolution; however several additional bits of resolution become usable by taking multiple samples and constructing them in a pre-designed manner. This provides a very accurate input signal that does not require any significant hardware pre-conditioning.

The A/D converter's resolution can be 16384 steps over a 2 volt range. As the data samples are inputted and buffered, the maximum and minimum sample values are tracked. This is done to reduce the requirement for floating point math operations. By keeping the minimum and maximum readings, the data samples can be normalized back into 8 bit integer data without loosing resolution information, allowing the rest of the heavy data buffering to be done using less memory. If all data are left as floating point then the techniques would not be possible on this low end of the microcontroller 30.

The microcontroller 30 further comprises a temperature sensor 34 for determining a temperature of the target with respect to an ambient temperature so as to control a sensitivity of the microcontroller 30. The microcontroller 30 further comprises an internal 5.5 Mhz oscillators 35, wherein the infrared energy 10 is affected by the ambient temperature, signal analysis taken place at the microcontroller 30 need to be adjusted to take into account any change in ambient temperature as detected by the temperature sensor 34.

According to the present invention, no detected signal will be filtered or removed before it is measured and computed like the conventional energy detection device, wherein when a real signal is erroneously filtered or removed as noise signal, the sensitivity of the energy detection device is adversely affected. Therefore, in order to maximize the sensitivity of the energy detection system and process of the present invention, all output signals 23 are fed to the AID converter 31 of the microcontroller 30 from the pyroelectric sensor 20 and converted into data samples for data processing to distinguish the real signals and the noise signals.

According to the present invention, the process of energy signal detection comprises the following steps.

(a) Collect and receive a plurality of data samples converted from the A/D converter 31 of the microcontroller 30 and generate a predetermined number of constructed sample windows of constructed samples in time.

(b) Determine a control range for each of the constructed sample windows.

(c) Determine whether there is an alarm condition by comparing relationships between successive constructed sample windows.

(d) Generate an output signal when the alarm condition is qualified.

The step (a) further comprises the steps of:

(a1) acquiring data samples from the A/D converter;

(a2) constructing a predetermined number of raw data samples to create a single constructed sample; and (a3) buffering a predetermined number of constructed samples to form one or more constructed sample windows in time.

In the step (a2), the raw data samples are statistically processed with time. The constructed sample is constructed from the group of raw data samples for the purpose of removing noise and increasing resolution.

According to the preferred embodiment, a plurality of raw data samples is averaged to form a single constructed sample. In other words, none of the conversion signals will be individually taken as accurate measurement. According to the preferred embodiment of the present invention, for example, 18 raw data samples are averaged to form a single constructed sample. It should be noticed that when 4 data samples are averaged to generate the constructed sample, it gives another 1 bit input resolution, and that when 16 data samples are averaged to generate the constructed sample, it gives another 2 bits input resolution. Therefore, the averaging of the data samples into constructed samples further enhances the input resolution for 2 more bits and thus rendering the input resolution of the energy detection system and process of the present invention from 11 bits to 13 bits.

In the step (a3), according to the preferred embodiment of the present invention, since all data samples converted from the output signals from the pyroelectric sensor 20 are treated and averaged into constructed samples for data processing, noise is treated as 25 part of the signals too. Thus, these signals which contain a noise component as well as signal data should be treated and analyzed in a control range manner. The calculation of the control range of a constructed sample window in time comprises a predetermined number of successive constructed samples, for example 26.

Figure 5A:
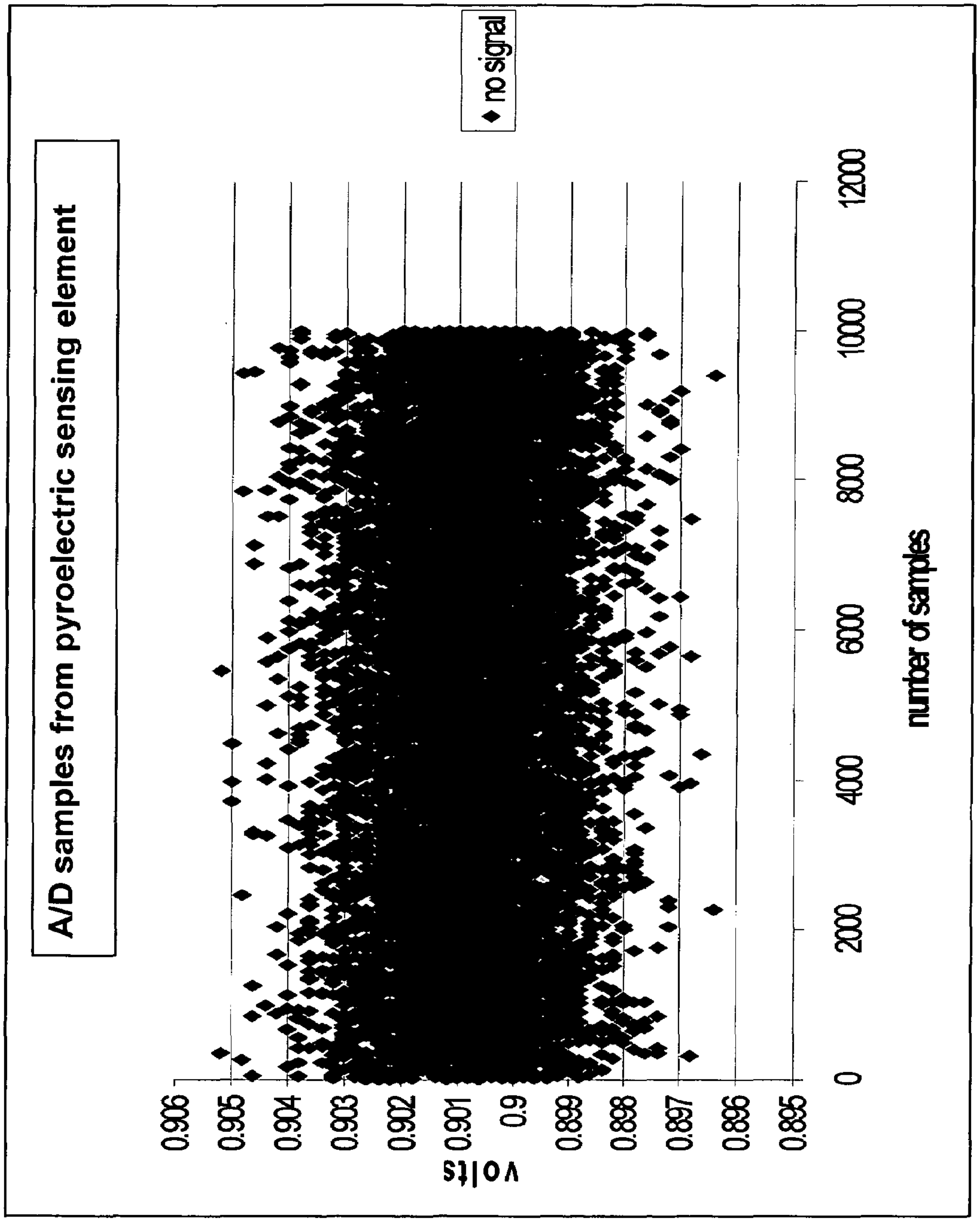
FIG. 5A is a chart illustrating A/D samples from pyroelectric sensing element when there is no signal according to the above preferred embodiment of the present invention.
Figure 5B:
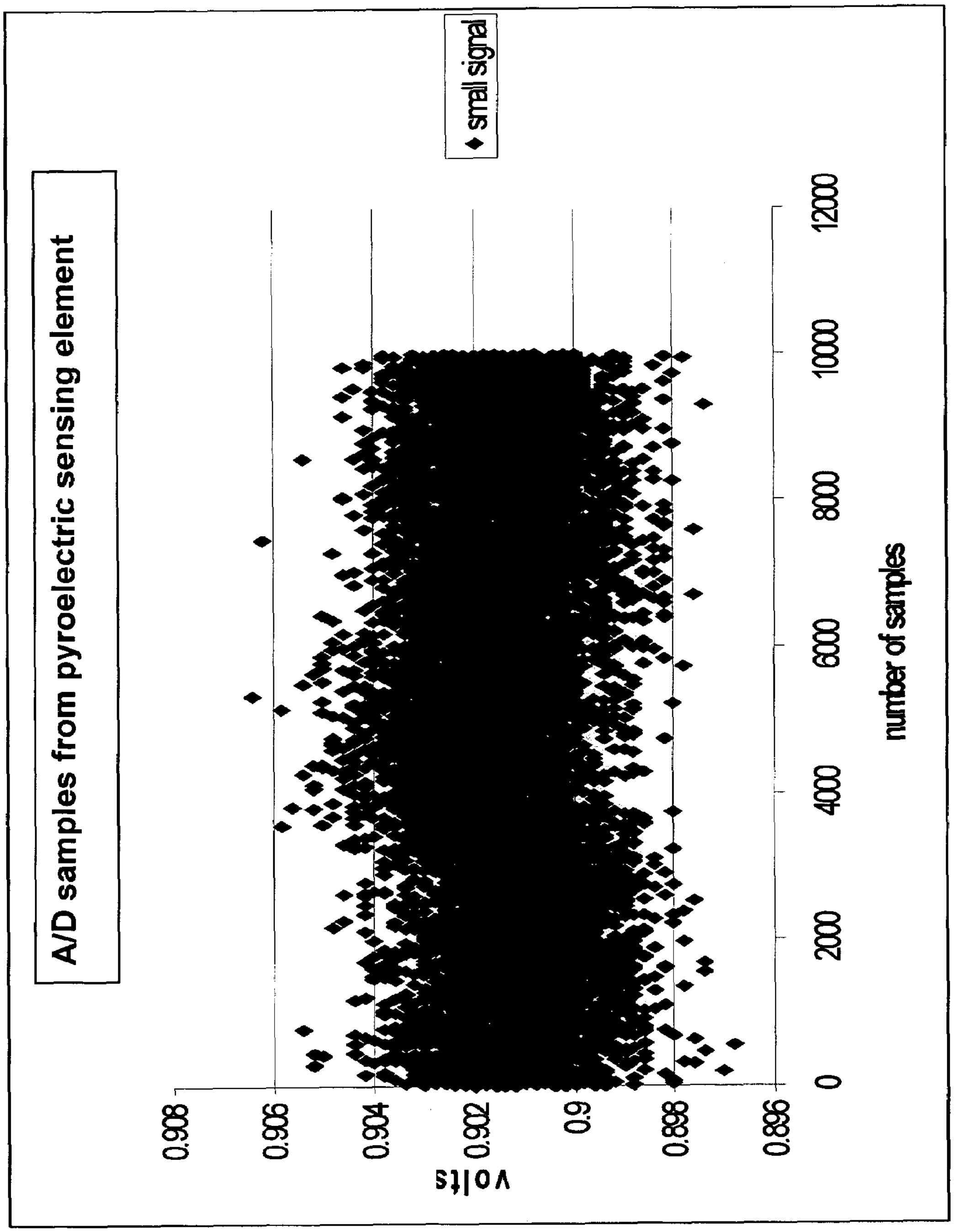
FIG. 5B is a chart illustrating A/D samples from pyroelectric sensing element when there is small signal according to the above preferred embodiment of the present invention.

Referring to FIGS. 5A and 5B, if the data samples, including real signals and noise, are analyzed, it is found that it is normally distributed. With normally distributed data, a textbook shortcut can be used to calculate the standard deviation. It is appreciated that 68.26% of the data will fall within 1 standard deviation of the mean, 95.46% of the data will be within 2 standard deviations, and 99.73% will fall within 3 standard deviations. In other words, by means of three standard deviations, 99.73% of all the constructed samples are expected to fall within the control range of the respective constructed sample window.

One such rigid characteristic is that 99.73% of the data that make up a normal distribution falls within standard deviations of the average. In practice, it is assumed that all data points plotted should fall within the three standard deviation limits, i.e. Upper Control Limit (UCL) and Lower Control Limit (LCL). This appears reasonable given the very low incidence of data points falling outside the UCL and LCL in a normal distribution (3 in 1000).

In the step (a3), the prerequisite factors for calculating the control range are determined from each constructed sample window. These factors are, the constructed sample window range, i.e. constructed sample maximum (MAX)—constructed sample minimum (MIN), and the constructed sample window average (AVE), i.e. sum of constructed samples divided by number of constructed samples.

In the step (b), in order to determine the control range of each of the constructed sample windows, the UCL and LCL of each of the constructed sample windows can be computed by taking the constructed sample window average (AVE) and adding/subtracting the constructed sample range multiplied by an A2 factor, wherein the A2 factor is a coefficient that is based on the size of the constructed sample window, i.e. the number of constructed sample being put together in that constructed sample window. It only works for normally distributed data. In other words, the A2 factor is an efficient and quick method for calculating the standard derivations, for example 3 standard derivations. It can only be used with the distribution of the data is normal distributed (i.e. Gaussian/Bell Curve). The A2 factor of a constructed sample window size of 20 is 0.16757. The formula for computing the A2 factor is "A2 Factor=1.7621 (constructed sample window size) to the exponent of (−0.7854)".

Figure 6:
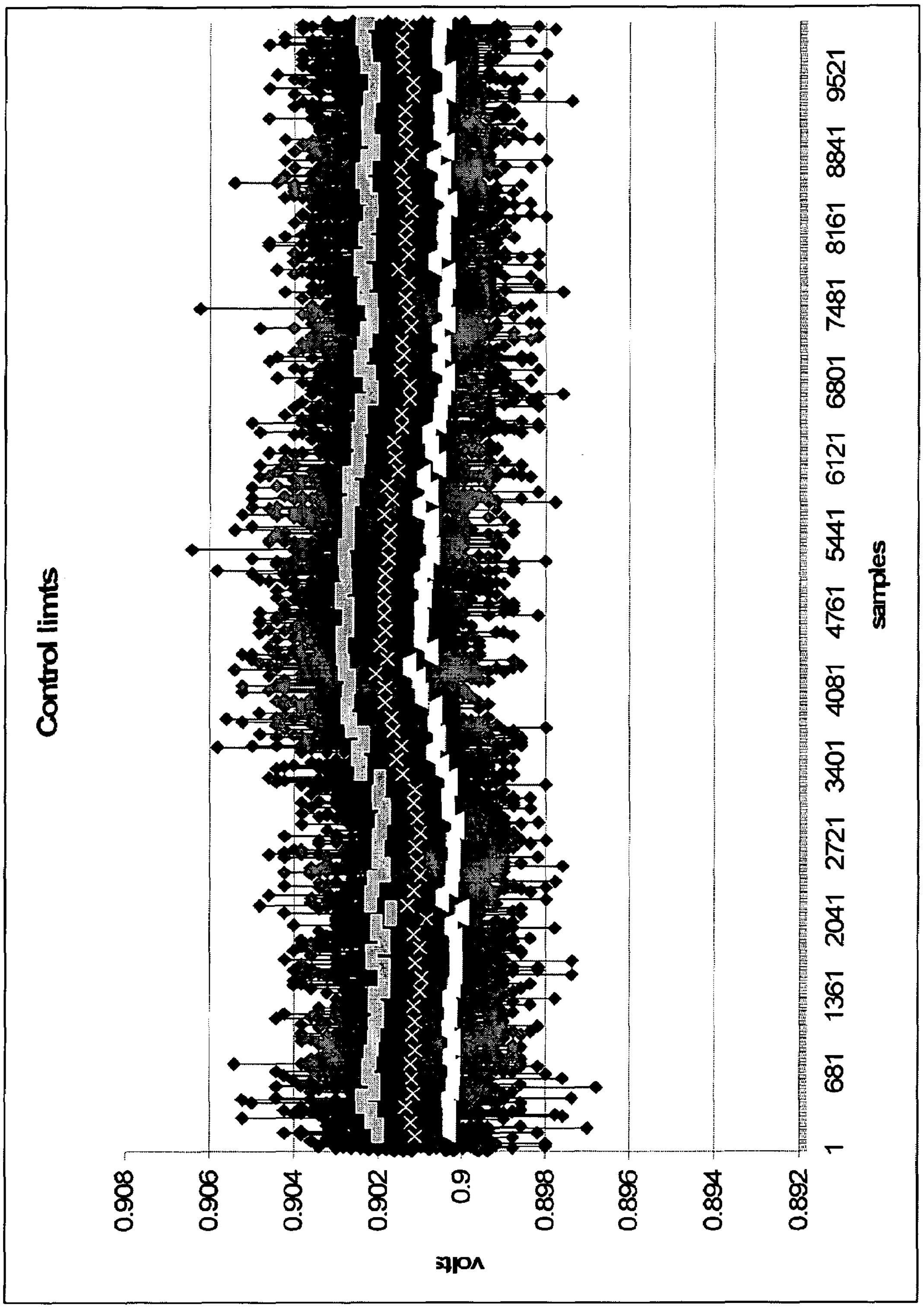
FIG. 6 is a chart illustrating the Upper and Lower Control Limits of the present invention according to the above preferred embodiment of the present invention.
Figure 7:
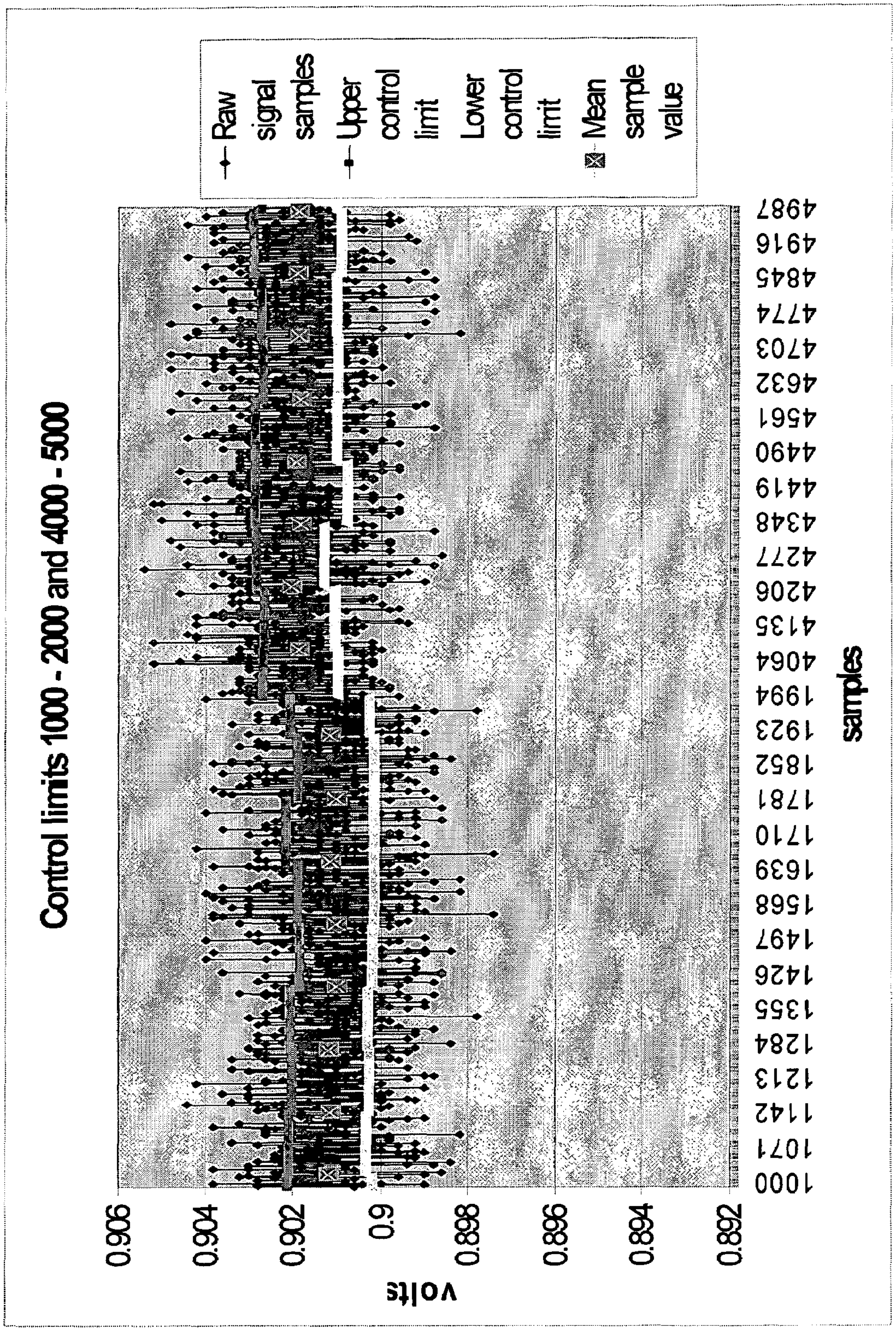
FIG. 7 is a chart illustrating the 1000-2000 sample window and the 4000-5000 sample window according to the above preferred embodiment of the present invention.
Figure 8:
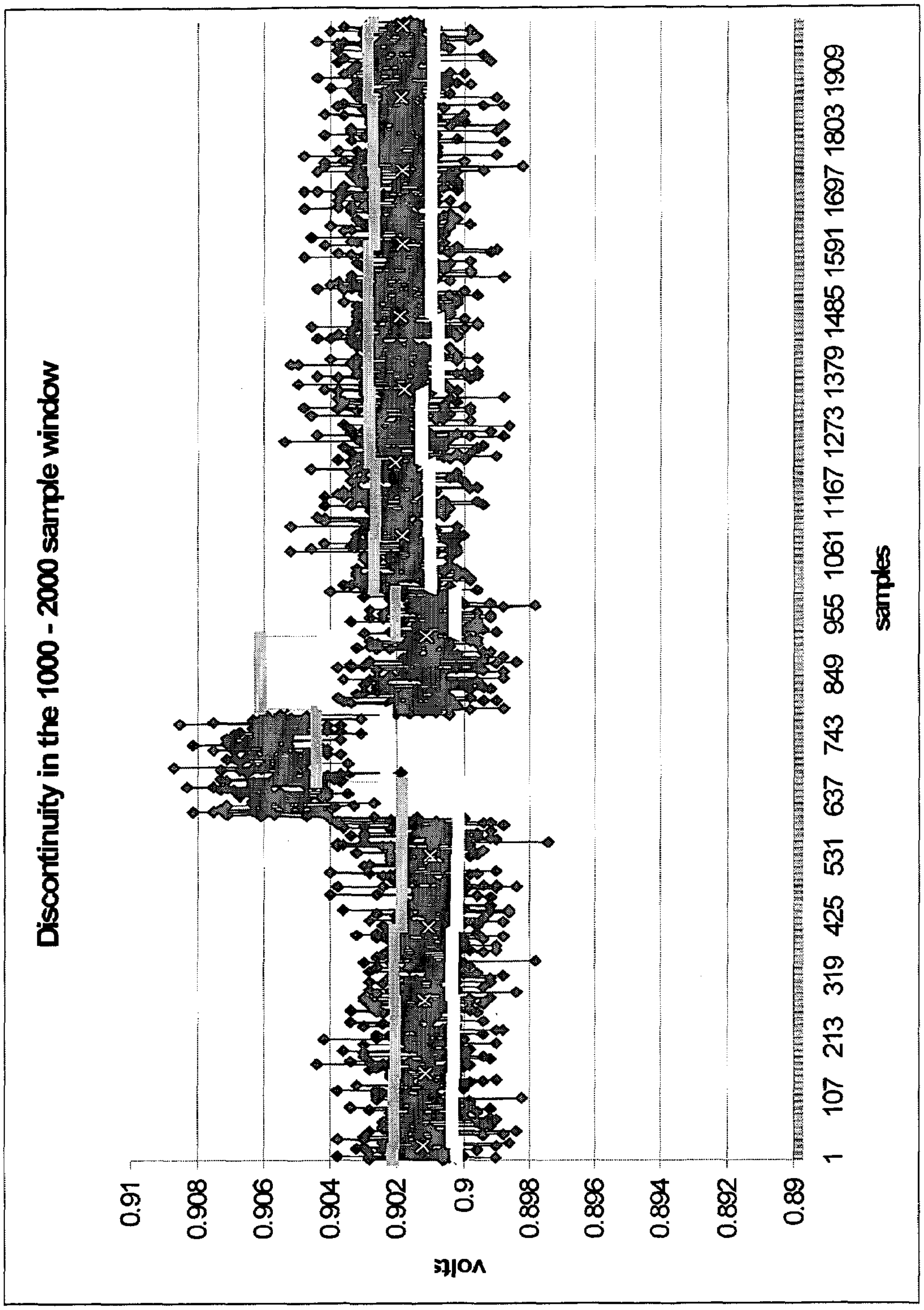
FIG. 8 is a chart illustrating discontinuity in the 1000-2000 sample window according to the above preferred embodiment of the present invention.

In other words, the decision of the alarm pre-condition is not based on the raw data samples or individual constructed sample data, but based on the Upper Control Limits and Lower Control Limits of the constructed sample windows, as shown in FIGS. 6-8, wherein the UCL and LCL are calculation for each constructed sample window as follows:

$$UCL=AVE+A2\times Range$$

$$LCL=AVE-A2\times Range$$

In order to use the Upper and Lower Control Limits in real time, the present invention provides a plurality of control limits at differing time intervals, so that it can use said control limits (UCL/LCL) for comparing the relationships between the control limits (UCLs/LCLs) of two or more constructed sample windows to determine the alarm pre-condition, as shown in FIGS. 7 and 8. This requires the present invention to be able to buffer a fair amount of data, i.e. constructed samples. This is the reason that the raw data samples are normalized from floating point back to 8 bit data values. It is appreciated that the embodied microcontroller 30, i.e. the ZiLOG Z8 XP 8 Pin SOIC, has 1000 bytes of internal ram storage.

The step (c) further comprises the following steps:

(c1) Group a predetermined number of successive constructed sample windows to form a window group for comparing the relationships between the successive constructed sample windows of the window group, wherein a space is formed between every two successive constructed sample windows. According to the preferred embodiment, four successive constructed sample windows are put together to form a window group and the space between the two successive constructed sample windows is preferred to be made of 1 to 2 constructed samples.

(c2) Analyze any statistically significant change among the control limit ranges between their UCL and LCL of the constructed sample windows in the window group to distinguish between noise and real signals so as to determine whether there is an alarm pre-condition.

In the step (c2), in order to have a significant alarm event, all the successive constructed sample windows in the window group must follow the same direction of trend change.

Figure 12A:
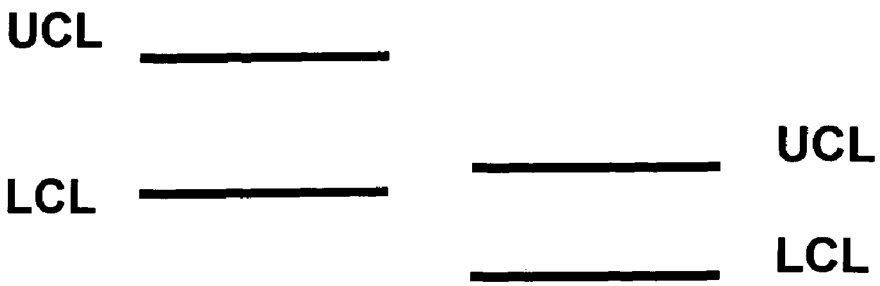
FIG. 12A to FIG. 12C are diagrams illustrating various types of crossing between constructed sample windows in the window group according to the preferred embodiment of the present invention.
Figure 12B:
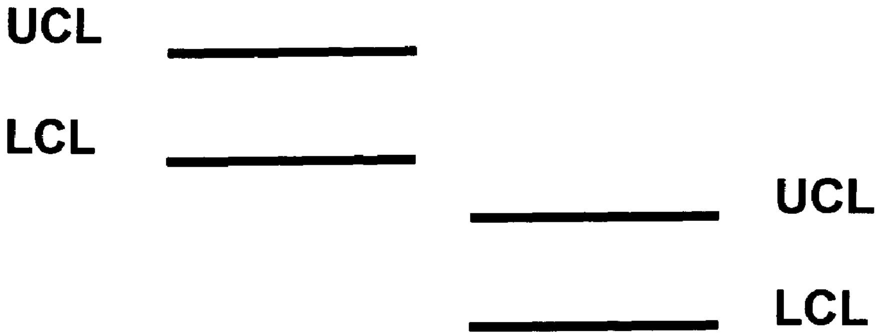
Figure 12C:
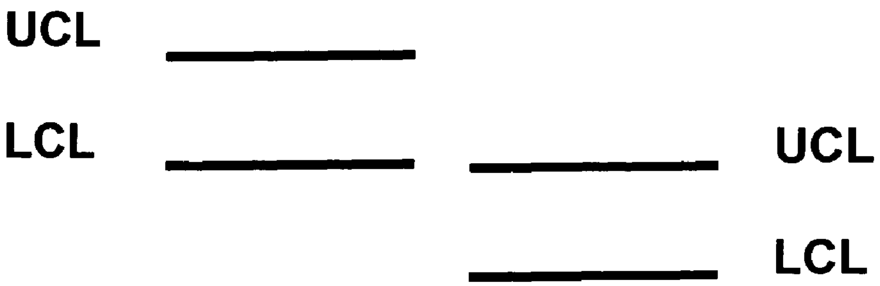

According to the present invention, crossing between two successive constructed sample windows means one of the UCL and LCL of one constructed sample window is compared with one of the complimentary control limit (UCL/LCL) of another previous or subsequent constructed sample window in a window group for variation, such as a less than crossing as shown in FIG. 12A, a greater than crossing as shown in FIG. 12B, a equal to crossing as shown in FIG. 12C, wherein the percentage of crossing can be ranging from 50% to 500%.

Figure 13A:
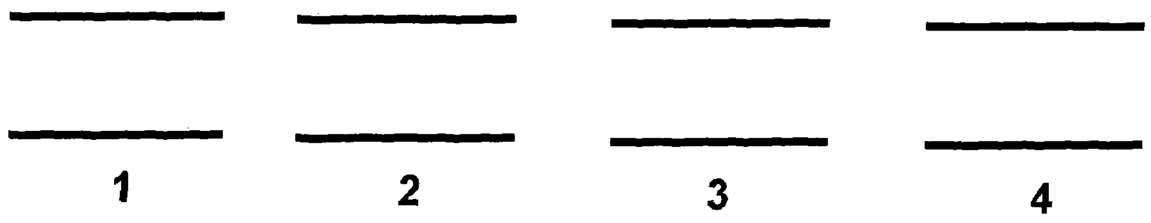
FIG. 13A is a diagram illustrating a no-crossing change of the constructed sample windows in a window group according to the preferred embodiment of the present invention.
Figure 13B:
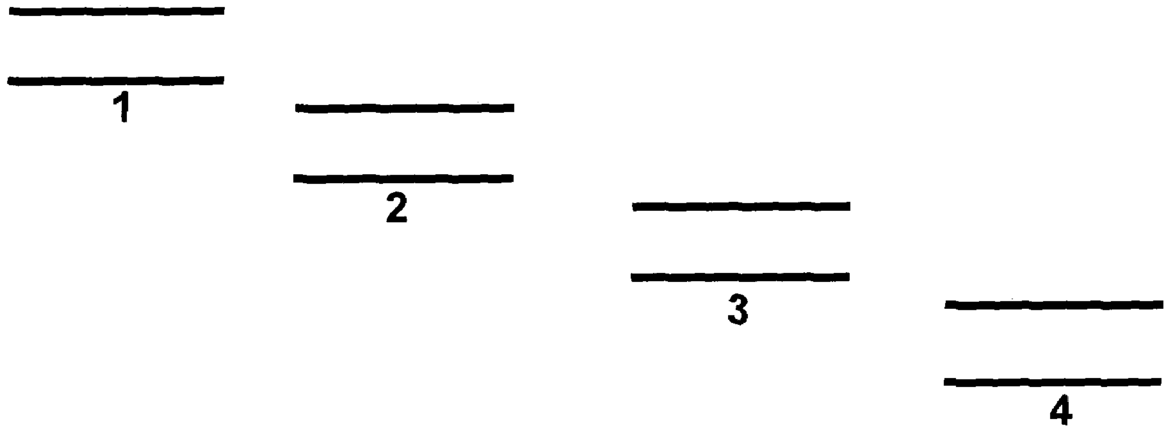
FIG. 13B is a diagram illustrating a crossing down change of the constructed sample windows in a window group according to the preferred embodiment of the present invention.
Figure 13C:
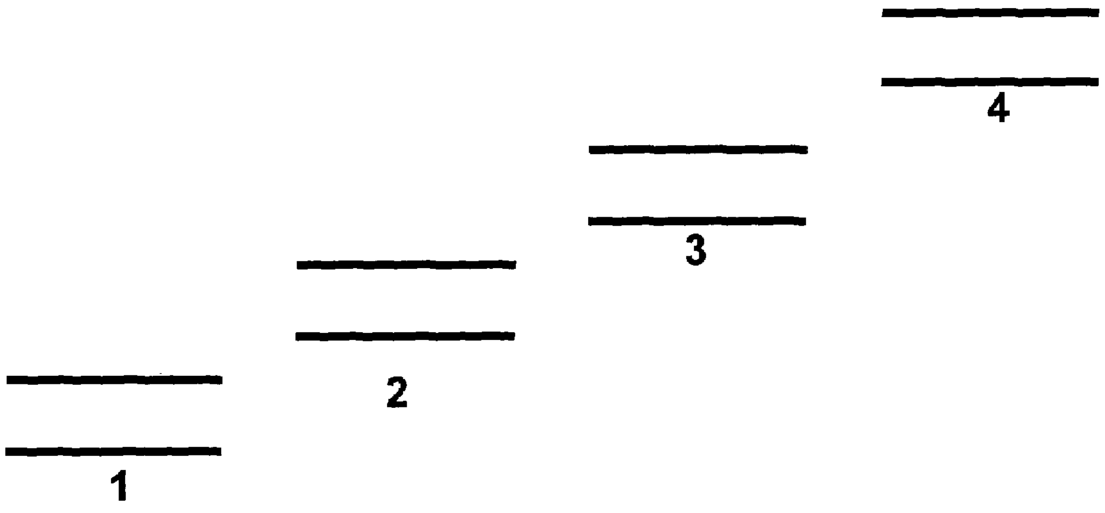
FIG. 13C is a diagram illustrating a crossing up change of the constructed sample windows in a window group according to the preferred embodiment of the present invention.

For example, as shown in FIG. 13A, when the constructed sample windows in the window group are in a row, no alarm pre-condition will be considered. When the 1-4 constructed sample windows in the window group are either crossing in a down trend as shown in FIG. 13B or crossing in an up trend as shown in FIG. 13C, it starts to qualify an alarm pre-condition.

After the step (c2), the step (c) further comprises a step (c3) of identifying the crossing among constructed sample windows in the window group to determine whether the alarm pre-condition is created by noise or real signals by means of the slope or trend of the constructed sample windows.

In the step (c3), for normal energy signal detection, a first slope detection is processed. Depending on the size of the data buffer, a predetermined number of window groups is analyzed as buffering window groups at one time for sloping direction and the microcontroller 30 is statistically preset to determine an alarm condition when a first predetermined number of window groups out of the predetermined number of buffering window groups trend in the same direction, e.g. down trend or up trend. According to the preferred embodiment of the present invention, the data buffer can be fed with 100 or more constructed samples at any point of time, so that 24 buffering window groups are being analyzed and, at any point of time, at least 17 window groups, for example, out of the 24 buffering window groups must trend in the same direction, with no reverse trend while neutral trend being all right, in order to qualify the alarm pre-condition into an alarm condition. When any window group of the buffering window groups is not trending towards the same direction, said buffering window groups at that time are discarded.

It should be noted that if any reverse direction happens for any window group with the buffering window groups, it must be something wrong with the system and it reflects as no actual condition of the detecting area. Then, the process is reset.

For fast energy signal detection, a second slope detection is processed in the step (c3) in addition to the first slope detection. Every time when a new constructed sample is fed into the data buffer, the microcontroller 30 recalculates all the conditions, including the slope response of the window groups and the control limits, to determine whether the down trend or up trend of the constructed sample windows is a fast trend.

When a fast trend is found, such as the condition that a person is running quickly across a PIR motion sensor (the energy signal detection system), a predetermined number of fast constructed sample windows is grouped, wherein each fast constructed sample window contains a predetermined number of successive constructed samples, for example four. According to the preferred embodiment of the present invention, for example, three fast constructed sample windows are required to form a fast window group for determining the slope trend, wherein each space between two successive fast constructed sample windows is made of 1 to 2 constructed samples.

In order for any fast window group to be considered, all fast constructed sample windows in the fast window group should be either in an up trend or a down trend manner. To determine whether there is an alarm pre-condition, according to preferred embodiment at least five successive fast window groups are sloping either in an up trend manner or a down trend manner to start a period measurement process.

When there are five or more fast window groups trending towards a direction within a certain predetermined time period, it is an illustration that there is a valid slope and the system will look for any complimentary slope within a qualified time period. The slope of the UCL/LCL substantially helps to determine the nature of the signals. Technically speaking, fast movement always generates frequency component and therefore the time period is measured. If the period of time is too short or too long, it indicates frequency outside the interest of the system and the system discards it.

After a first occurrence of five or more fast window groups being trend towards an initial direction, either up trend or down trend, a first timer starts to count for a second occurrence of the subsequent five fast window groups trend towards an opposite direction which triggers a second timer to start to count while the first timer stops. The second timer will count for a third subsequent occurrence of another five fast window groups being trend towards the initial direction. Then, the second timer stops and the first timer will start to count for a fourth occurrence of subsequent five fast window groups being trend towards the opposite direction of the initial direction. Then, the first timer stops again and the second timer starts again to count for a fifth occurrence of subsequent five fast window groups being trend towards the initial direction again.

According to the preferred embodiment, the above detection process is set for three cycles of period detection, including three up trends and three down trends in order to trigger the alarm condition. In other words, each half cycle has five fast window groups trending towards the same direction within a predetermined time period, indicating an alarm condition and thus qualifying the alarm pre-condition into the alarm condition. In the step (d), when an alarm condition is determined, the system generates an output signal to change the output state from restore to alarm for a predetermined time period according to the preferred embodiment, giving an alarm pulse for at least one second to the control panel or corresponding device connected to the energy signal detection system.

Conventionally, in order to prevent false alarms created by white light, a costly lens made of specific material that can block white light is equipped with the energy signal detection system to filter the white light. Alternatively, the lens or the sensor is installed with a white light filter to filter the white light. This filter approach is not only costly but will reduce sensitivity under all conditions even for the intended operation of infrared energy detection regardless of the presence of white light or not. Some conventional devices contain a white light detector, such as a CDS photocell detector, to give the detector the ability to measure the presence of white light so the detector can qualify the validity of the white light so as to not create a false alarm. While this approach is better then a filter, it is also colstly as well.

Figure 3:
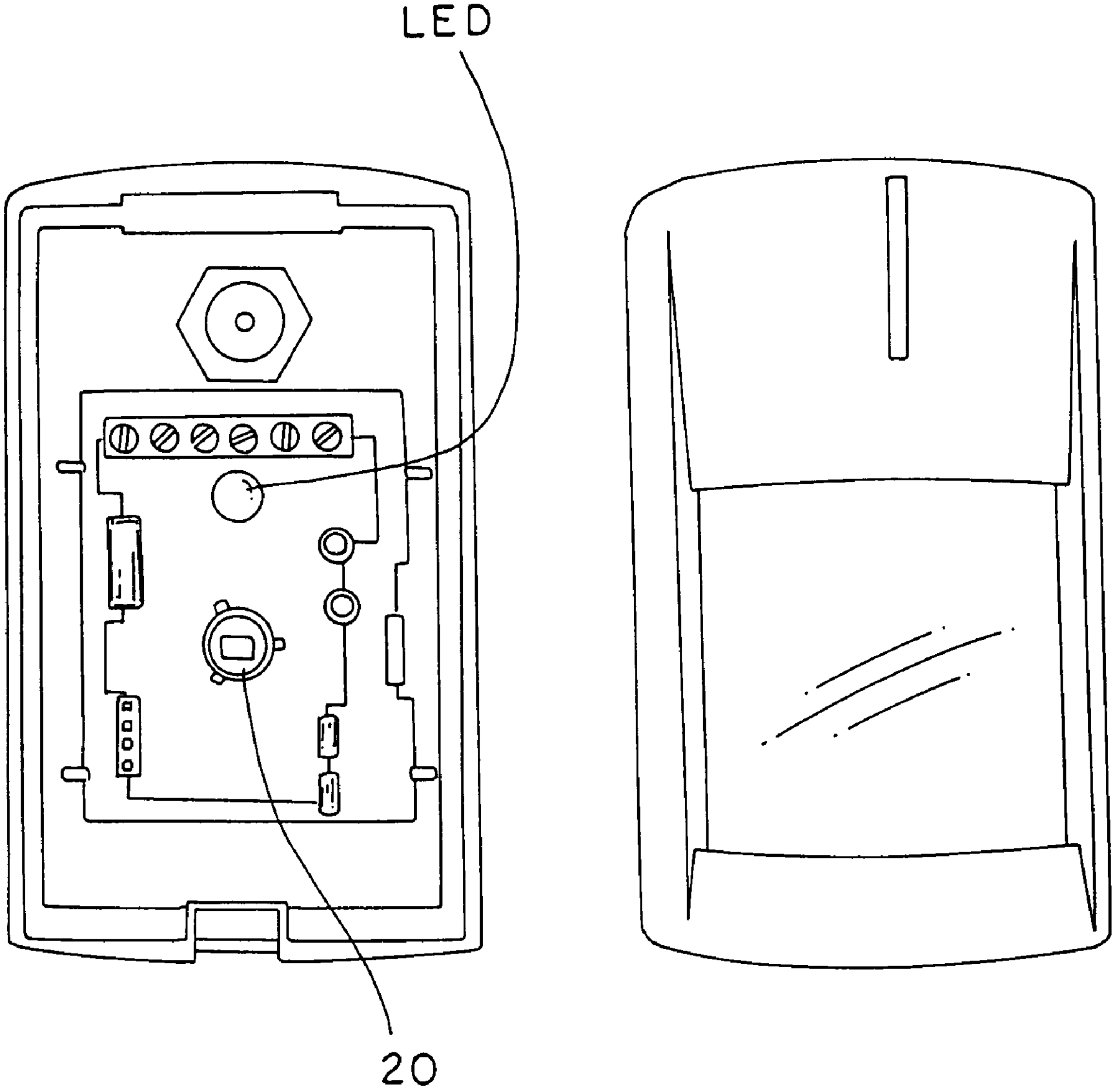
FIG. 3 is an exploded perspective view illustrating the physical components of the energy signal detection system, embodied as a motion sensor, according to the above preferred embodiment of the present invention.
Figure 4:
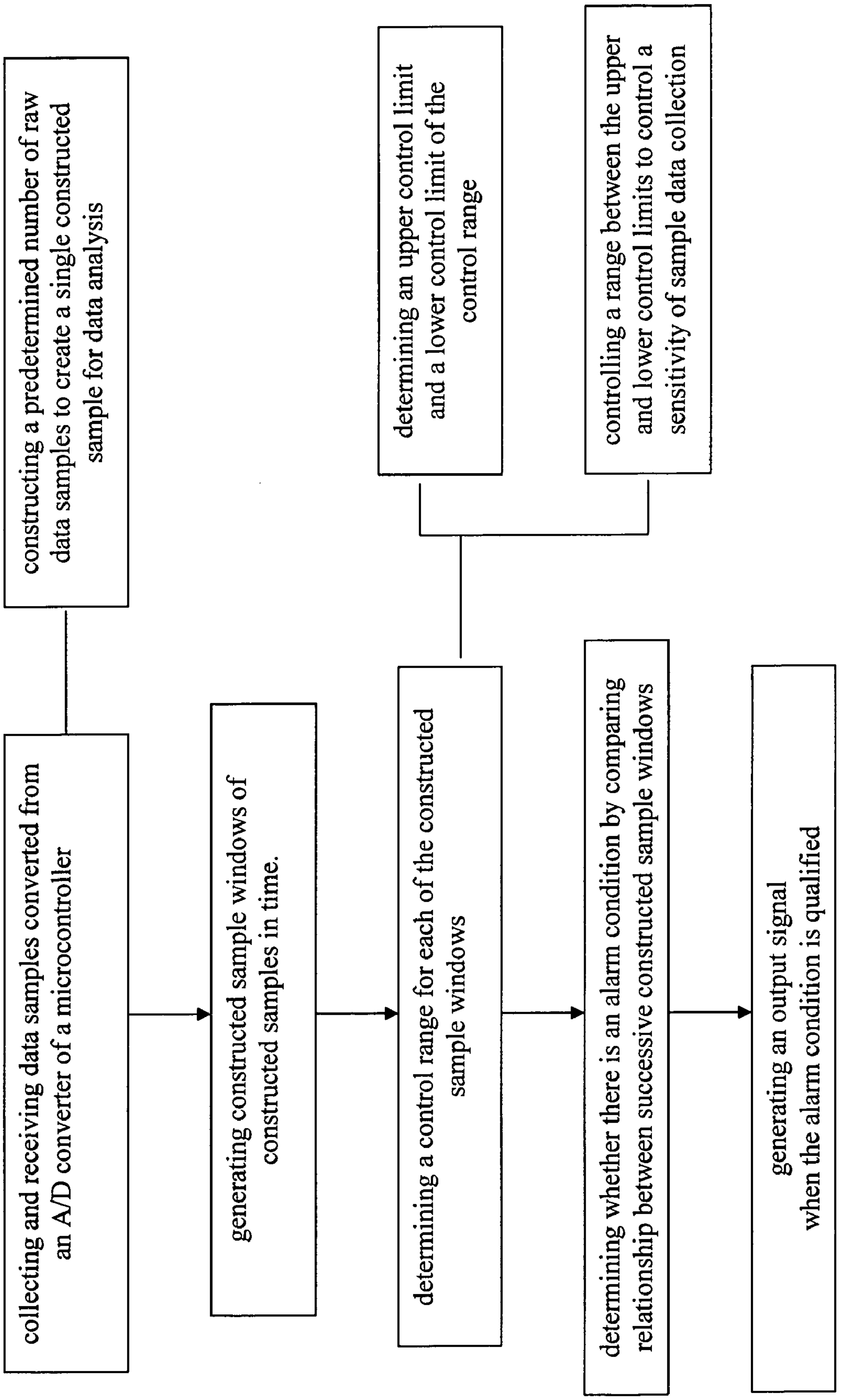
FIG. 4 is a flow diagram for the method of energy signal detection according to the above preferred embodiment of the present invention.
Figure 9:
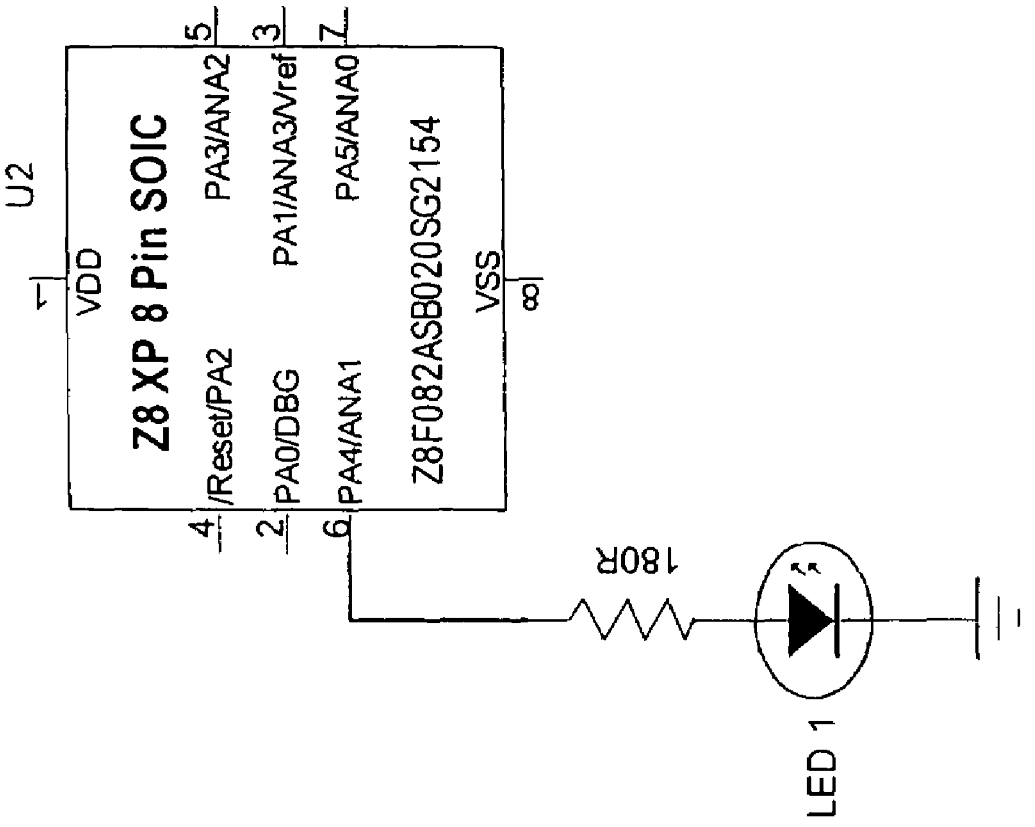
FIG. 9 is an enlarged schematic circuit diagram illustrating the white light detector of the energy signal detection system according to the above preferred embodiment of the present invention.

The present invention substantially provides a most economic and innovative method to solve the white light problem by simply taking advantage of the LED that is generally contained in all kinds of energy signal detection system, such as a motion sensor, for indicating movement occurred and whether the sensor is in an ON/OFF condition to the user walking by, without installing any additional part or component. Referring to FIGS. 3 and 9, the energy signal detection system of the present invention comprises a light emitting diode (LED) electrically connected to PIN6 of the microcontroller 30 and a resistor R11 in series in such a manner that when white light sights on the LED, a measurable mini voltage signal will be generated, which is a mini-voltage change proportional to the intensity of the white light on the LED. The voltage signal is utilized in the energy signal detection system of the present invention as a white light detection and feeds into the microcontroller 30 for data processing.

Figure 10:
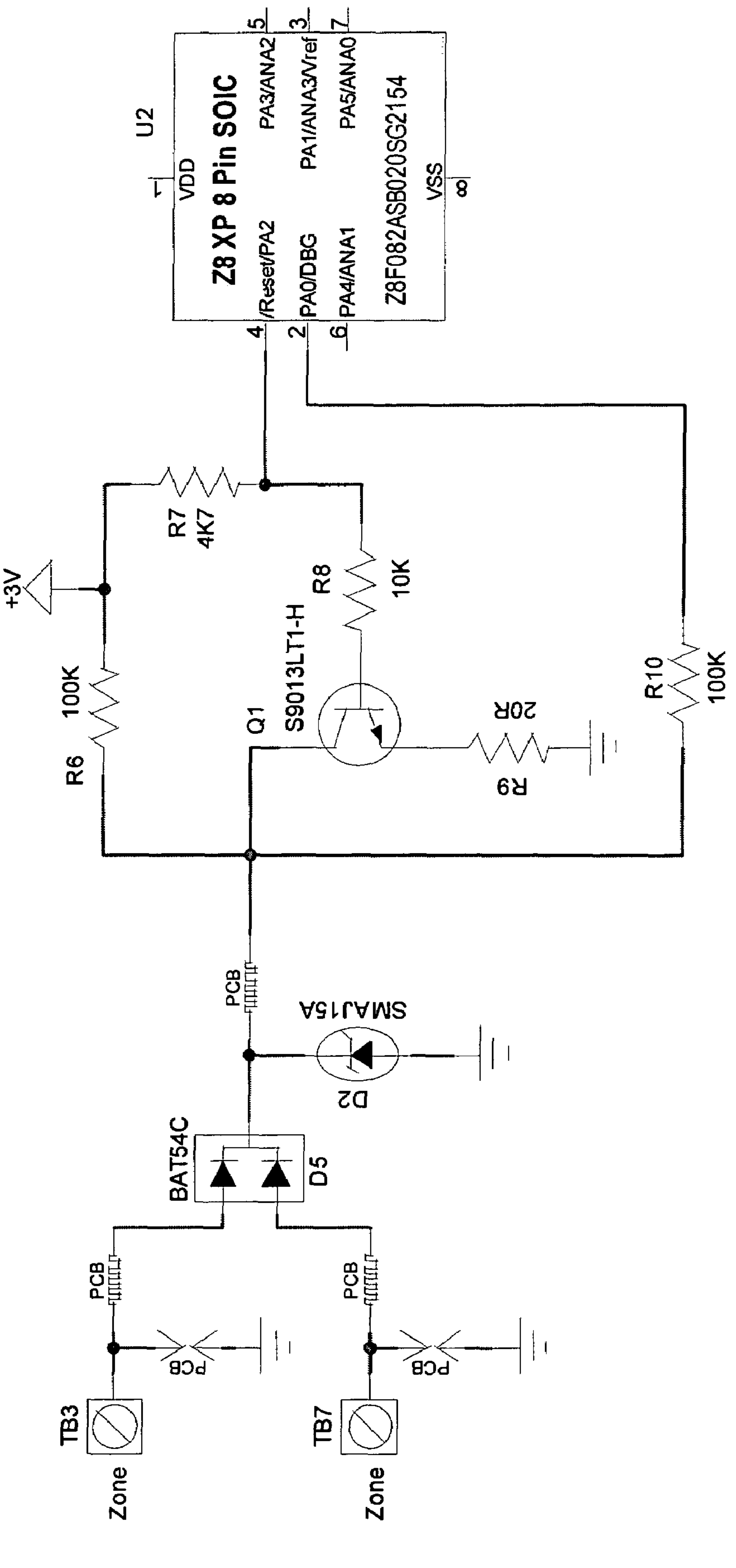
FIG. 10 is an enlarged schematic circuit diagram illustrating the non polarity sensitive alarm output circuit of the energy signal detection system according to the above preferred embodiment of the present invention.

Referring to of FIGS. 2 and 10, the alarm output circuit of the energy signal detection system according to the preferred embodiment of the present invention is a non polarity sensitive alarm output circuit which is a non polarity output by dual switching the ZONE and COM connections of the control panel to ground. Conventional, motion sensors or other energy signal detection system output and connected to the ZONE and COM connections of a control alarm panel or other equipments by using a relay. According to the present invention, no relay is required and that a dual switch to GND is provided.

Figure 14A:
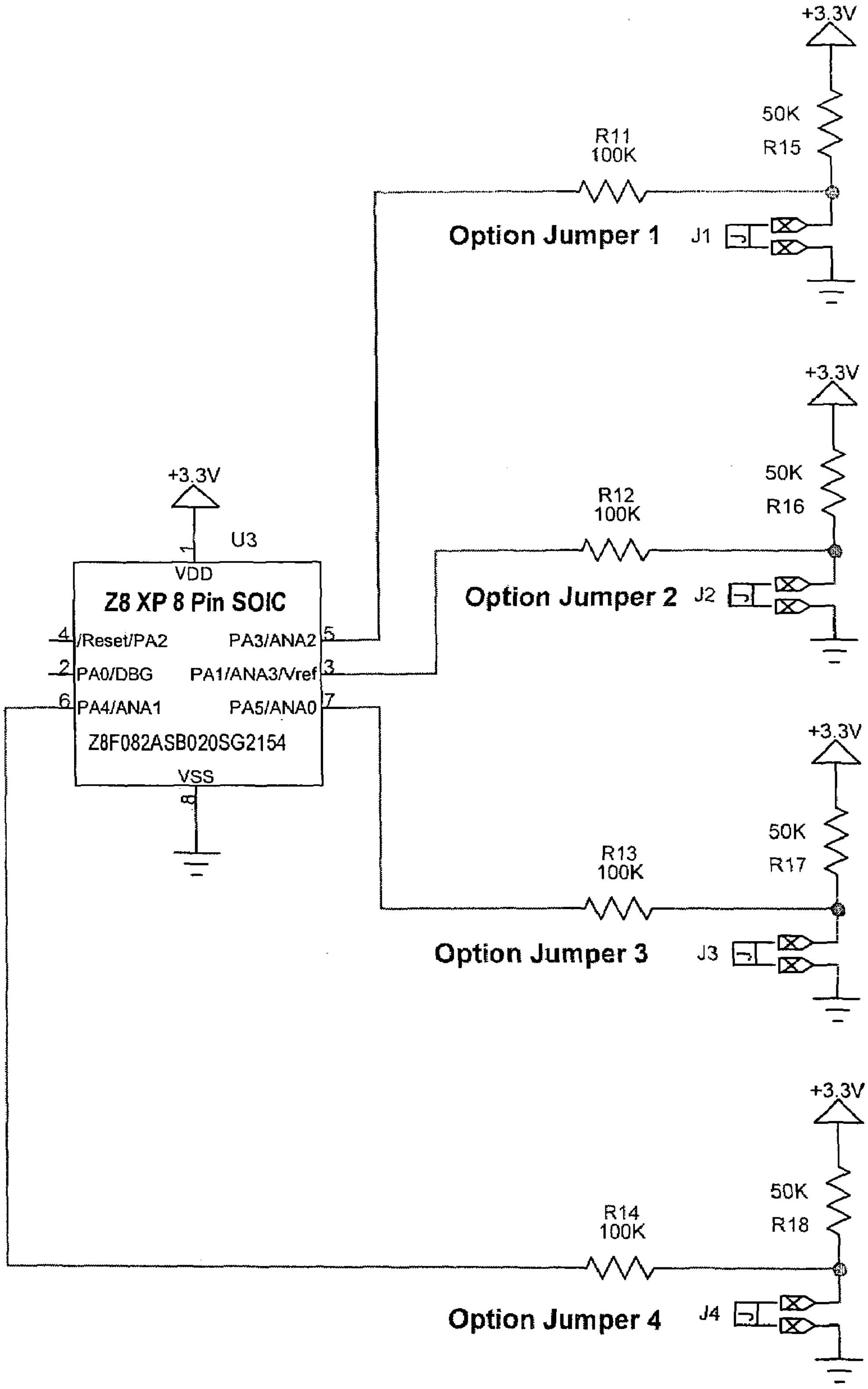
FIG. 14A Prior Art
FIG. 14A is a circuit diagram illustrating a traditional jumper circuit.
Figure 14B:
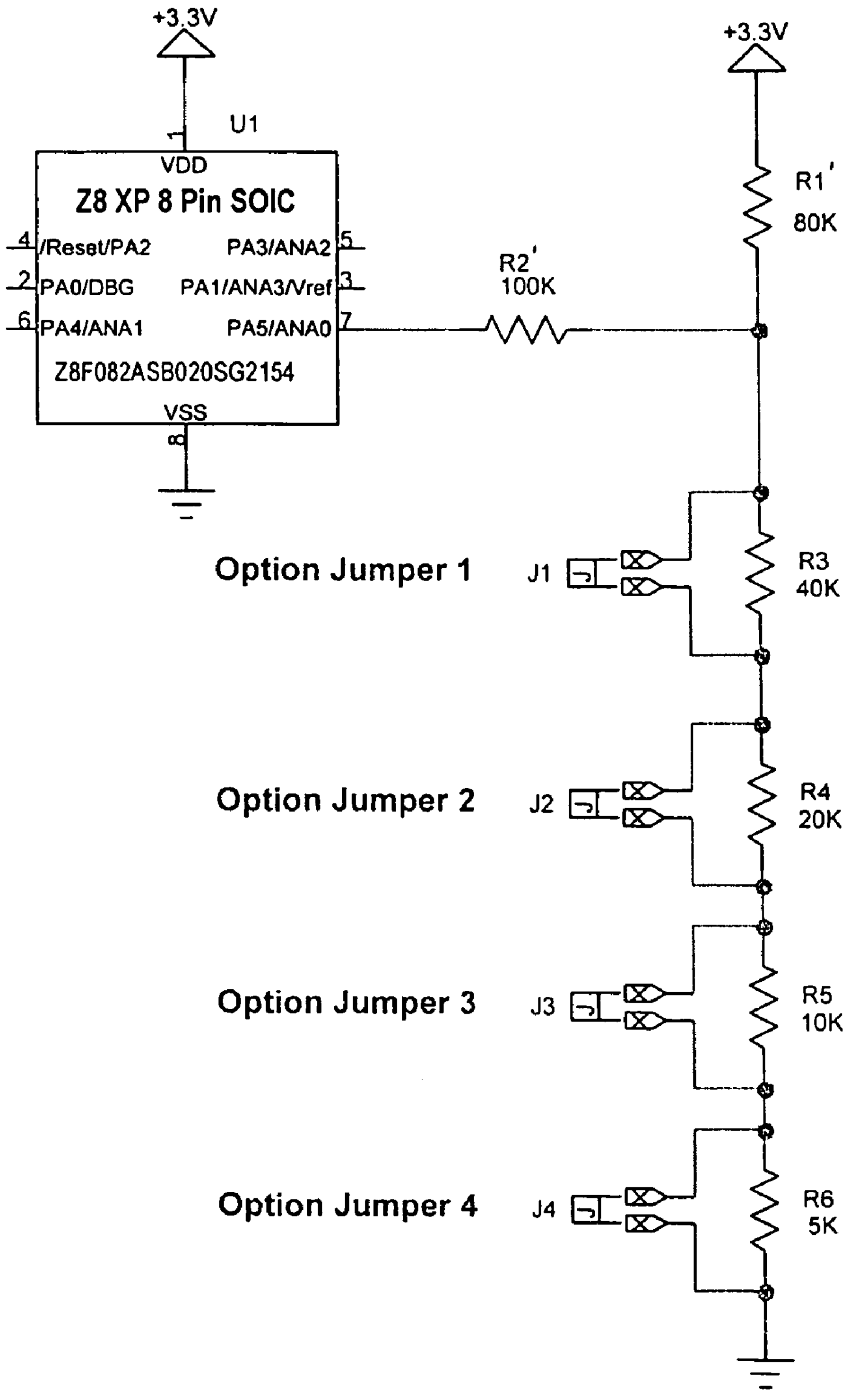
FIG. 14B is a circuit diagram illustrating a jumper tree circuit according to the above preferred embodiment of the present invention.

Referring to FIG. 14A, if a traditional jumper circuit is used with the microcontroller 30, each option jumper requires a separate input on the microcontroller 30, a separate input resistor (R11, R12, R13, R14), a separate pull up resistor (R15, R16, R17, R18), and a power consumption (current through the pull up resistor when the jumper is present). Referring to FIGS. 2 and 14B, a jumper tree circuit is used in the energy signal detection system according to the preferred embodiment of the present invention, which comprises two or more option jumpers connected in series with the PN7 of the microcontroller 30. As shown in FIG. 14B, supporting multiple jumpers 1 to 4 requires only one A/D converter input (ANA0), only one pull up resistor (R1'), only one input resistor (R2'), and a single "weighted" resistor for each jumper, wherein the power consumption (current through the pull up resistor (R1')) is lower than the conventional jumper circuit. It is worth to mention that, a predetermined number of jumpers equal (a predetermined squared) number of combinations that can be read by the A/D converter. For example four jumpers equals 16 unique voltage ranges that can be read by the A/D converter and decoded in software to determine the status of each jumper.

Figure 14C:
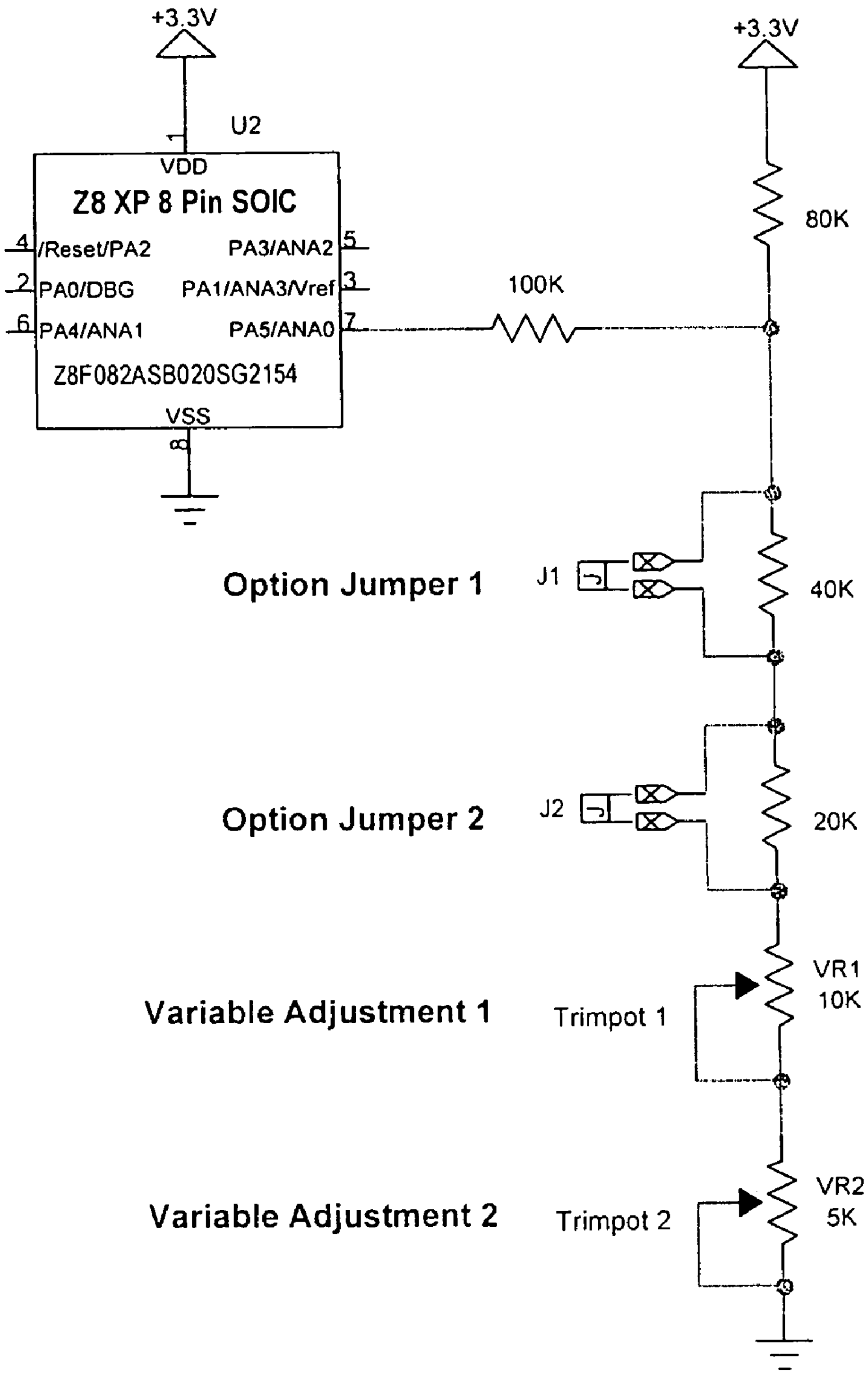
FIG. 14C is a circuit diagram illustrating an alternative mode of the jumper tree circuit according to the above embodiment of the present invention.

Referring to FIG. 14C, an alternative mode of the jumper tree circuit as shown in FIG. 14B according to the preferred embodiment of the present invention is illustrated, wherein one or more variable resistors are used. Referring to FIG. 14B, it can be noted that the A/D converter input is read and decoded into a number of ranges. Each jumper or variable resistor represents a range of values. This allows the value of one or more weighted variable resistors to be decoded along with the status of the jumpers. This also allows for a number of YES/NO options (jumpers) as well as a number of ranges (variable resistors for sensitivity, volume, intensity etc.) to be read and decoded by the A/D converter and the software on a single A/D converter input.

According to the above description of the present invention, the process and system of energy signal detection substantially achieve the following features:

(1) The present invention not only improves the sensitivity, performance and reliability thereof, but also reduces false alarms by distinguishing between noise and real signals.

(2) All energy signals detected are being inputted for distinguishing between environmental noise and real signals through statistical computation. In other words, no energy signal will be filtered before computation like the conventional energy signal detector that may result in removing real signals at the same time while filtering noise signals.

(3) According to the process and system of energy signal detection of the present invention, the environmental noise and real signals included in the detected energy signals being inputted are distinguished by means of the control ranges between Upper Control Limits (UCL) and Lower Control Limits (LCL) which are calculated and used based on standard deviations points and the A2 factor.

(4) It improves energy input resolution by providing a differential voltage reference internally for the inputted energy signals.

(5) The present invention further increases resolution by not taking any signal conversion as an accurate measurement of the signals but to sample all inputted energy signals with time for data processing.

(6) The process and system of energy signal detection provides a non polarity output by dual switching the "ZONE" and "COM" connections of the control panel to ground.

(7) The process and system of energy signal detection of the present invention can avoid false alarm created by white light without the use of complicated and expensive lens that is made to block the white light or the installation of a white light filter on the lens or the sensor or a white light detector, such as CDS photocell detector.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A process of energy signal detection, comprising said steps of:

(a) receiving a plurality of data samples and generating a predetermined number of constructed sample windows of constructed samples in time;

(b) determining a control range for each of said constructed sample windows;

(c) determining whether there is an alarm pre-condition by comparing relationships between successive constructed sample windows; and (d) generating an output signal when said alarm pre-condition is qualified.

2. The process, as recited in claim 1, wherein the step (a) further comprises the steps of:

(a1) acquiring said data samples;

(a2) constructing said data samples to create said constructed samples; and (a3) buffering said constructed samples to form one or more said constructed sample windows in time.

3. The process, as recited in claim 2, wherein, in the step (a2), said data samples are statistically processed with time and said constructed sample is constructed from said data samples for increasing resolution.

4. The process, as recited in claim 2, wherein, in the step (a2), said data samples are averaged into said constructed samples for data processing.

5. The process, as recited in claim 4, wherein 18 of said data samples are averaged to form said single constructed sample.

6. The process, as recited in claim 4, wherein, in the step (a3), said data samples containing noise and signal data are treated and analyzed in a control range manner.

7. The process, as recited in claim 6, wherein by means of three standard deviations, most of said constructed samples would fall within said control range of said respective constructed sample window and said control range falls between an Upper Control Limit (UCL) and Lower Control Limit (LCL).

8. The process, as recited in claim 7, wherein the step (c) further comprises the steps of:

(c1) grouping a predetermined number of said successive constructed sample windows to form a window group for comparing said relationships between said successive constructed sample windows of said window group, wherein a space of a predetermined number of said constructed samples is formed between every said successive window group; and (c2) analyzing any statistically significant change among said control limit ranges between said UCL and LCL of said constructed sample windows in said window group to distinguish between noise and real signals so as to determine whether there is said alarm pre-condition.

9. The process, as recited in claim 8, wherein, after the step (c2), the step (c) further comprises a step (c3) of identifying said crossing among constructed sample windows in said window group to determine whether said alarm pre-condition is created by noise or real signals by means of said slope or trend of said constructed sample windows.

10. The process, as recited in claim 9, wherein for fast energy signal detection, the step (c3) further processes another slope detection that every time when a new constructed sample is fed into said data buffer, said microcontroller recalculates all said conditions, including said slope response of said window groups and said control limits, to determine whether said down trend or up trend of said constructed sample windows is a fast trend.

11. The process, as recited in claim 10, wherein when a fast trend is found, a predetermined number of fast constructed sample windows is grouped, wherein each fast constructed sample window contains a predetermined number of successive constructed samples, wherein in order for any fast window group to be considered, all fast constructed sample windows in said fast window group should be either in an up trend or a down trend manner, wherein to determine whether there is an alarm pre-condition.

12. The process, as recited in claim 11, wherein when there are a predetermined number of fast window groups trending towards a direction within a certain predetermined time period, there is a valid slope to look for any complimentary slope within a qualified time period.

13. The process, as recited in claim 12, wherein after a first occurrence of a predetermined number of fast window groups being trend towards an initial direction, either up trend or down trend, a first timer starts to count for a second occurrence of said subsequent predetermined number of fast window groups trend towards an opposite direction which triggers a second timer to start to count while said first timer stops, and then said second timer counts for a third subsequent occurrence of another said predetermined number of fast window groups being trend towards said initial direction, and then said second timer stops and said first timer starts to count for a fourth occurrence of subsequent said predetermined number of fast window groups being trend towards said opposite direction of said initial direction, and then, said first timer stops again and said second timer starts again to count for a fifth occurrence of subsequent said predetermined number of fast window groups being trend towards said initial direction again.

14. The process, as recited in claim 13, wherein said detection process is set for a predetermined number of cycles of period detection, including said predetermined number of up trends and said predetermined number of down trends in order to trigger said alarm condition, wherein each half cycle has said predetermined number of fast window groups trending towards said same direction within a predetermined time period, indicating an alarm condition and thus qualifying said alarm pre-condition into said alarm condition.

15. The process, as recited in claim 8, wherein, in the step (c2), in order to have a significant alarm event, all said successive constructed sample windows in said window group must follow said same direction of trend change.

16. The process, as recited in claim 15, wherein crossing between two successive constructed sample windows means one of said UCL and LCL of one constructed sample window is compared with one of said complimentary control limit (UCL/LCL) of another previous or subsequent constructed sample window in a window group for variation, including a less than crossing, a greater than crossing and a equal to crossing, wherein said percentage of crossing can be ranging from 50% to 500%.

17. The process, as recited in claim 16, wherein when said constructed sample windows in said window group are in a row, no alarm pre-condition is considered, wherein when said constructed sample windows in said window group are either crossing in a down trend or crossing in an up trend, said alarm pre-condition is qualified.

18. The process, as recited in claim 16, wherein, after the step (c2), the step (c) further comprises a step (c3) of identifying said crossing among constructed sample windows in said window group to determine whether said alarm pre-condition is created by noise or real signals by means of said slope or trend of said constructed sample windows.

19. The process, as recited in claim 18, wherein for fast energy signal detection, the step (c3) further processes another slope detection that every time when a new constructed sample is fed into said data buffer, said microcontroller recalculates all said conditions, including said slope response of said window groups and said control limits, to determine whether said down trend or up trend of said constructed sample windows is a fast trend.

20. The process, as recited in claim 19, wherein when a fast trend is found, a predetermined number of fast constructed sample windows is grouped, wherein each fast constructed sample window contains a predetermined number of successive constructed samples, wherein in order for any fast window group to be considered, all fast constructed sample windows in said fast window group should be either in an up trend or a down trend manner, wherein to determine whether there is an alarm pre-condition.

21. The process, as recited in claim 20, wherein when there are a predetermined number of fast window groups trending towards a direction within a certain predetermined time period, there is a valid slope to look for any complimentary slope within a qualified time period.

22. The process, as recited in claim 21, wherein after a first occurrence of a predetermined number of fast window groups being trend towards an initial direction, either up trend or down trend, a first timer starts to count for a second occurrence of said subsequent predetermined number of fast window groups trend towards an opposite direction which triggers a second timer to start to count while said first timer stops, and then said second timer counts for a third subsequent occurrence of another said predetermined number of fast window groups being trend towards said initial direction, and then said second timer stops and said first timer starts to count for a fourth occurrence of subsequent said predetermined number of fast window groups being trend towards said opposite direction of said initial direction, and then, said first timer stops again and said second timer starts again to count for a fifth occurrence of subsequent said predetermined number of fast window groups being trend towards said initial direction again.

23. The process, as recited in claim 21, wherein said detection process is set for a predetermined number of cycles of period detection, including said predetermined number of up trends and said predetermined number of down trends in order to trigger said alarm condition, wherein each half cycle has said predetermined number of fast window groups trending towards said same direction within a predetermined time period, indicating an alarm condition and thus qualifying said alarm pre-condition into said alarm condition.

24. The process, as recited in claim 7, wherein in the step (a3), a plurality of prerequisite factors for calculating said control range are determined from each of said constructed sample windows, wherein said factors are constructed sample maximum (MAX), constructed sample minimum (MIN), and said constructed sample window average (AVE).

25. The process, as recited in claim 24, wherein, in the step (b), in order to determine said control range of each of said constructed sample windows, said UCL of each of said constructed sample windows is computed by taking said constructed sample window average (AVE) and adding said constructed sample range multiplied by an A2 factor and said LCL of each of said constructed sample windows is computed by taking said constructed sample window average (AVE) and subtracting said constructed sample range multiplied by said A2 factor.

26. The process, as recited in claim 25, wherein said A2 factor is a coefficient that is based on said size of said constructed sample window, that is said number of constructed sample being put together in that constructed sample window.

27. The process, as recited in claim 26, wherein said A2 factor of a constructed sample window size of 20 is 0.16757 and said formula for computing said A2 factor is that A2 Factor=1.7621 (constructed sample window size) to said exponent of (−0.7854).

28. The process, as recited in claim 26, wherein the step (c) further comprises the steps of:

(c1) grouping a predetermined number of said successive constructed sample windows to form a window group for comparing said relationship between said successive constructed sample windows of said window group, wherein a space is formed between every said successive constructed sample window; and (c2) analyzing any statistically significant change among said control limit ranges between said UCL and LCL of said constructed sample windows in said window group to distinguish noise and real signals so as to determine whether there is said alarm pre-condition.

29. The process, as recited in claim 28, wherein, after the step (c2), the step (c) further comprises a step (c3) of identifying said crossing among constructed sample windows in said window group to determine whether said alarm pre-condition is created by noise or real signals by means of said slope or trend of said constructed sample windows.

30. The process, as recited in claim 28, wherein, in the step (c2), in order to have a significant alarm event, all said successive constructed sample windows in said window group must follow said same direction of trend change.

31. The process, as recited in claim 30, wherein four successive constructed sample windows are put together to form a window group and said space between said two successive constructed sample windows is preferred to be made of 1 to 2 constructed samples.

32. The process, as recited in claim 30, wherein crossing between two successive constructed sample windows means one of said UCL and LCL of one constructed sample window is compared with one of said complimentary control limit (UCL/LCL) of another previous or subsequent constructed sample window in a window group for variation, including a less than crossing, a greater than crossing and a equal to crossing, wherein said percentage of crossing can be ranging from 50% to 500%.

33. The process, as recited in claim 32, wherein when said constructed sample windows in said window group are in a row, no alarm pre-condition is considered, wherein when said constructed sample windows in said window group are either crossing in a down trend or crossing in an up trend, said alarm pre-condition is qualified.

34. The process, as recited in claim 32, wherein, after the step (c2), the step (c) further comprises a step (c3) of identifying said crossing among constructed sample windows in said window group to determine whether said alarm pre-condition is created by noise or real signals by means of said slope or trend of said constructed sample windows.

35. The process, as recited in claim 34, wherein in the step (c3), for normal energy signal detection, a first slope detection is processed, wherein depending on a size of said data buffer, a predetermined number of window groups is analyzed as buffering window groups at one time for sloping direction and said microcontroller is statistically preset to determine an alarm condition when a first predetermined number of window groups out of said predetermined number of buffering window groups trend in said same direction, that is down trend or up trend.

36. The process, as recited in claim 35, wherein for fast energy signal detection, a second slope detection is processed in the step (c3) in addition to a first slope detection that every time when a new constructed sample is fed into said data buffer, said microcontroller recalculates all said conditions, including said slope response of said window groups and said control limits, to determine whether said down trend or up trend of said constructed sample windows is a fast trend.

37. The process, as recited in claim 36, wherein when a fast trend is found, a predetermined number of fast constructed sample windows is grouped, wherein each fast constructed sample window contains a predetermined number of successive constructed samples, wherein in order for any fast window group to be considered, all fast constructed sample windows in said fast window group should be either in an up trend or a down trend manner, wherein to determine whether there is an alarm pre-condition.

38. The process, as recited in claim 37, wherein when there are a predetermined number of fast window groups trending towards a direction within a certain predetermined time period, there is a valid slope to look for any complimentary slope within a qualified time period.

39. The process, as recited in claim 38, wherein after a first occurrence of a predetermined number of fast window groups being trend towards an initial direction, either up trend or down trend, a first timer starts to count for a second occurrence of said subsequent predetermined number of fast window groups trend towards an opposite direction which triggers a second timer to start to count while said first timer stops, and then said second timer counts for a third subsequent occurrence of another said predetermined number of fast window groups being trend towards said initial direction, and then said second timer stops and said first timer starts to count for a fourth occurrence of subsequent said predetermined number of fast window groups being trend towards said opposite direction of said initial direction, and then, said first timer stops again and said second timer starts again to count for a fifth occurrence of subsequent said predetermined number of fast window groups being trend towards said initial direction again.

40. The process, as recited in claim 39, wherein said detection process is set for a predetermined number of cycles of period detection, including said predetermined number of up trends and said predetermined number of down trends in order to trigger said alarm condition, wherein each half cycle has said predetermined number of fast window groups trending towards said same direction within a predetermined time period, indicating an alarm condition and thus qualifying said alarm pre-condition into said alarm condition.

41. The process, as recited in claim 40, wherein, in the step (d), when an alarm condition is determined, said system generates an output signal to change said output state from restore to alarm for a predetermined time period, giving an alarm pulse for at least one second to a corresponding device connected thereto.

42. A system of energy signal detection, comprising:

an energy sensor defining a detecting area and detecting energy directed therewithin to produce inputted energy signals;

a microcontroller, which is electrically connected to said energy sensor, comprising a means for converting said inputted energy signals into data samples, wherein a plurality of data samples are constructed to form a predetermined number of constructed sample windows of constructed samples in time, wherein a control range is determined for each of said constructed sample windows, and thus by comparing said relationship between said successive constructed sample windows, said microcontroller is capable of determining whether there is an alarm condition or pre-condition; and an alarm output circuit electrically connected from said microcontroller for changing output state from restore to alarm for a predetermined period of time when said microcontroller determines said alarm condition.

43. The system, as recited in claim 42, further comprises a light emitting diode (LED) electrically connected to said microcontroller and a resistor in series in such a manner that when white light sights on said LED, a measurable mini voltage signal is generated, which is a mini-voltage change proportional to said intensity of said white light on said LED, wherein said voltage signal is utilized in said system as a white light detection and feeds into said microcontroller for data processing.

44. The system, as recited in claim 42, wherein said alarm output circuit is a non polarity sensitive alarm output circuit which is a non polarity output by dual switching said ZONE and COM connections of said control panel to ground.

45. The system, as recited in claim 42, further comprising a jumper tree circuit which comprises two or more option jumpers connected in series with said microcontroller, wherein only one pull up resistor and one input resistor are required and also a single "weighted" resistor for each said option jumper is required.

46. The system, as recited in claim 45, wherein one or more of said option jumpers are variable resistors.

47. The system, as recited in claim 42, wherein said energy sensor is a pyroelectric sensor which is a pyroelectric sensing element adapted for sensing energy radiation, wherein said infrared radiation as an input signal is converted into an output signal through a signal conversion module of said pyroelectric sensor, wherein said output signals generally contain real signals with low frequency and noise signals mixed therewith.

48. The system, as recited in claim 47, wherein said converting means of said microcontroller is an analog to digital converter (A/D converter) converting said output signals from said pyroelectric sensor to data samples for data processing.

49. The system, as recited claim 48, wherein said A/D converter provides a differential voltage reference internally for said inputted energy signals, wherein said microcontroller is fed with a voltage reference, generated from an internal voltage reference generator while said microcontroller is further fed with said output signals from said pyroelectric sensor.

50. The system, as recited in claim 49, wherein said microcontroller internally provides a 1V voltage reference while 0V-2V output signals are fed to said microcontroller from said pyroelectric sensor, wherein any output signal inputted from said pyroelectric sensor is a positive signed signal when its voltage is between 1V to 2V, or is a negative signed signal when its voltage is between 0V to 1V.

51. The system, as recited in claim 49, further comprises a light emitting diode (LED) electrically connected to said microcontroller and a resistor in series in such a manner that when white light sights on said LED, a measurable mini voltage signal is generated, which is a mini-voltage change proportional to said intensity of said white light on said LED, wherein said voltage signal is utilized in said system as a white light detection and feeds into said microcontroller for data processing.

52. The system, as recited in claim 49, wherein said alarm output circuit is a non polarity sensitive alarm output circuit which is a non polarity output by dual switching said ZONE and COM connections of said control panel to ground.

53. The system, as recited in claim 49, further comprising a jumper tree circuit which comprises two or more option jumpers connected in series with said microcontroller, wherein only one pull up resistor and one input resistor are required and also a single "weighted" resistor for each said option jumper is required.

54. The system, as recited in claim 42, wherein said microcontroller acquires said data samples, constructs said data samples to create said constructed samples, and buffers said constructed samples to form one or more said constructed sample windows in time.

55. The system, as recited in claim 54, wherein said data samples are statistically processed with time and said constructed sample is constructed from said data samples for a purpose of removing noise and increasing resolution.

56. The system, as recited in claim 54, wherein said data samples are averaged into said constructed samples for data processing.

57. The system, as recited in claim 56, wherein said data samples containing noise and signal data are treated and analyzed in a control range manner.

58. The system, as recited in claim 57, wherein by means of three standard deviations, most of said constructed samples would fall within said control range of said respective constructed sample window and said control range falls between an Upper Control Limit (UCL) and Lower Control Limit (LCL).

59. The system, as recited in claim 58, wherein a plurality of prerequisite factors for calculating said control range are determined from each of said constructed sample windows, wherein said factors are constructed sample maximum (MAX), constructed sample minimum (MIN), and said constructed sample window average (AVE).

60. The system, as recited in claim 59, wherein in order to determine said control range of each of said constructed sample windows, said UCL of each of said constructed sample windows is computed by taking said constructed sample window average (AVE) and adding said constructed sample range multiplied by an A2 factor and said LCL of each of said constructed sample windows is computed by taking said constructed sample window average (AVE) and subtracting said constructed sample range multiplied by said A2 factor.

61. The system, as recited in claim 60, wherein said A2 factor is a coefficient that is based on said size of said constructed sample window, that is said number of constructed sample being putted together in that constructed sample window.

62. The system, as recited in claim 60, wherein a predetermined number of said successive constructed sample windows is grouped to form a window group for comparing said relationship between said successive constructed sample windows of said window group, wherein a space is formed between every two successive constructed sample windows, wherein any statistically significant change among said control limit ranges between said UCL and LCL of said constructed sample windows in said window group is analyzed to distinguish noise and real signals so as to determine whether there is said alarm pre-condition.

63. The system, as recited in claim 62, wherein in order to have a significant alarm event, all said successive constructed sample windows in said window group must follow said same direction of trend change.

64. The system, as recited in claim 63, wherein crossing between two successive constructed sample windows means one of said UCL and LCL of one constructed sample window is compared with one of said complimentary control limit (UCL/LCL) of another previous or subsequent constructed sample window in a window group for variation, including a less than crossing, a greater than crossing and a equal to crossing, wherein said percentage of crossing can be ranging from 50% to 500%.

65. The system, as recited in claim 64, wherein when said constructed sample windows in said window group are in a row, no alarm pre-condition is considered, wherein when said constructed sample windows in said window group are either crossing in a down trend or crossing in an up trend, said alarm pre-condition is qualified.

66. The system, as recited in claim 65, wherein said microcontroller further identifies said crossing among constructed sample windows in said window group to determine whether said alarm pre-condition is created by noise or real signals by means of said slope or trend of said constructed sample windows.

67. The system, as recited in claim 66, further comprises a light emitting diode (LED) electrically connected to said microcontroller and a resistor in series in such a manner that when white light sights on said LED, a measurable mini voltage signal is generated, which is a mini-voltage change proportional to said intensity of said white light on said LED, wherein said voltage signal is utilized in said system as a white light detection and feeds into said microcontroller for data processing.

68. The system, as recited in claim 66, wherein said alarm output circuit is a non polarity sensitive alarm output circuit which is a non polarity output by dual switching said ZONE and COM connections of said control panel to ground.

69. The system, as recited in claim 66, further comprising a jumper tree circuit which comprises two or more option jumpers connected in series with said microcontroller, wherein only one pull up resistor and one input resistor are required and also a single "weighted" resistor for each said option jumper is required.

70. The system, as recited in claim 66, wherein said energy sensor is a pyroelectric sensor which is a pyroelectric sensing element adapted for sensing energy radiation, wherein said infrared radiation as an input signal is converted into an output signal through a signal conversion module of said pyroelectric sensor, wherein said output signals generally contain real signals with low frequency and noise signals mixed therewith.

71. The system, as recited in claim 70, wherein said converting means of said microcontroller is an analog to digital converter (A/D converter) converting said output signals from said pyroelectric sensor to data samples for data processing.

72. The system, as recited claim 71, wherein said A/D converter provides a differential voltage reference internally for said inputted energy signals, wherein said microcontroller is fed with a voltage reference, generated from an internal voltage reference generator while said microcontroller is further fed with said output signals from said pyroelectric sensor.

73. The system, as recited in claim 66, wherein for normal energy signal detection, a first slope detection is processed, wherein depending on a size of said data buffer, a predetermined number of window groups is analyzed as buffering window groups at one time for sloping direction and said microcontroller is statistically preset to determine an alarm condition when a first predetermined number of window groups out of said predetermined number of buffering window groups trend in said same direction, that is down trend or up trend.

74. The system, as recited in claim 73, wherein for fast energy signal detection, said microcontroller further processes another slope detection that every time when a new constructed sample is fed into said data buffer, said microcontroller recalculates all said conditions, including said slope response of said window groups and said control limits, to determine whether said down trend or up trend of said constructed sample windows is a fast trend.

75. The system, as recited in claim 74, wherein when a fast trend is found, a predetermined number of fast constructed sample windows is grouped, wherein each fast constructed sample window contains a predetermined number of successive constructed samples, wherein in order for any fast window group to be considered, all fast constructed sample windows in said fast window group should be either in an up trend or a down trend manner, wherein to determine whether there is an alarm pre-condition.

76. The system, as recited in claim 75, wherein when there are a predetermined number of fast window groups trending towards a direction within a certain predetermined time period, there is a valid slope to look for any complimentary slope within a qualified time period.

77. The system, as recited in claim 76, wherein after a first occurrence of a predetermined number of fast window groups being trend towards an initial direction, either up trend or down trend, a first timer starts to count for a second occurrence of said subsequent predetermined number of fast window groups trend towards an opposite direction which triggers a second timer to start to count while said first timer stops, and then said second timer counts for a third subsequent occurrence of another said predetermined number of fast window groups being trend towards said initial direction, and then said second timer stops and said first timer starts to count for a fourth occurrence of subsequent said predetermined number of fast window groups being trend towards said opposite direction of said initial direction, and then, said first timer stops again and said second timer starts again to count for a fifth occurrence of subsequent said predetermined number of fast window groups being trend towards said initial direction again.

78. The system, as recited in claim 77, wherein said detection process is set for a predetermined number of cycles of period detection, including said predetermined number of up trends and said predetermined number of down trends in order to trigger said alarm condition, wherein each half cycle has said predetermined number of fast window groups trending towards said same direction within a predetermined time period, indicating an alarm condition and thus qualifying said alarm pre-condition into said alarm condition.

79. The system, as recited in claim 78, wherein when an alarm condition is determined, said system generates an output signal to change said output state from restore to alarm for a predetermined time period, giving an alarm pulse for at least one second to a corresponding device connected to said system.

80. The system, as recited in claim 79, further comprises a light emitting diode (LED) electrically connected to said microcontroller and a resistor in series in such a manner that when white light sights on said LED, a measurable mini voltage signal is generated, which is a mini-voltage change proportional to said intensity of said white light on said LED, wherein said voltage signal is utilized in said system as a white light detection and feeds into said microcontroller for data processing.

81. The system, as recited in claim 79, wherein said alarm output circuit is a non polarity sensitive alarm output circuit which is a non polarity output by dual switching said ZONE and COM connections of said control panel to ground.

82. The system, as recited in claim 79, further comprising a jumper tree circuit which comprises two or more option jumpers connected in series with said microcontroller, wherein only one pull up resistor and one input resistor are required and also a single "weighted" resistor for each said option jumper is required.

83. The system, as recited in claim 82, wherein one or more of said option jumpers are variable resistors.

84. The system, as recited in claim 79, wherein said energy sensor is a pyroelectric sensor which is a pyroelectric sensing element adapted for sensing energy radiation, wherein said infrared radiation as an input signal is converted into an output signal through a signal conversion module of said pyroelectric sensor, wherein said output signals generally contain real signals with low frequency and noise signals mixed therewith.

85. The system, as recited in claim 84, wherein said converting means of said microcontroller is an analog to digital converter (A/D converter) converting said output signals from said pyroelectric sensor to data samples for data processing.

86. The system, as recited claim 85, wherein said A/D converter provides a differential voltage reference internally for said inputted energy signals, wherein said microcontroller is fed with a voltage reference, generated from an internal voltage reference generator while said microcontroller is further fed with said output signals from said pyroelectric sensor.

* * * * *